United States Patent
Li et al.

(10) Patent No.: US 10,102,319 B2
(45) Date of Patent: Oct. 16, 2018

(54) ELECTROMAGNETIC SCATTERING ANALYSIS MODULE USING SUBDIVISION BASED ISOGEOMETRIC ANALYSIS

(71) Applicant: Board of Trustees of Michigan State University, East Lansing, MI (US)

(72) Inventors: Jie Li, Lansing, MI (US); Shanker Balasubramaniam, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 104 days.

(21) Appl. No.: 15/210,972

(22) Filed: Jul. 15, 2016

(65) Prior Publication Data

US 2017/0018118 A1    Jan. 19, 2017

Related U.S. Application Data

(60) Provisional application No. 62/193,628, filed on Jul. 17, 2015.

(51) Int. Cl.
G06T 17/20 (2006.01)
G01B 7/00 (2006.01)
G06F 17/50 (2006.01)

(52) U.S. Cl.
CPC ...... G06F 17/5018 (2013.01); *G06F 2217/16* (2013.01)

(58) Field of Classification Search
None
See application file for complete search history.

(56) References Cited

U.S. PATENT DOCUMENTS

2009/0024370 A1    1/2009   Scott et al.
2016/0353056 A1*  12/2016   Cullen ............... G06K 9/00221

OTHER PUBLICATIONS

Yeom, Jae-Hyun, et al. "Block matrix preconditioner method for the electric field integral equation (EFIE) formulation based on loop-star basis functions." Progress in Electromagnetics Research 134 (2013): 543-558.*
Barendrecht, Pieter J. "Isogeometric analysis for subdivision surfaces." Eindhoven University of Technology: Eindhoven, The Netherlands (2013).*
Xiong, Xiaoyan YZ, et al. "A new EFIE method based on Coulomb gauge for the low-frequency electromagnetic analysis." Progress in Electromagnetics Research 140 (2013): 613-631.*

* cited by examiner

Primary Examiner — Yi Wang
(74) Attorney, Agent, or Firm — Harness, Dickey & Pierce, PLC

(57) ABSTRACT

An iso-geometric analysis technique based on subdivision is presented for boundary integral equations associated with electromagnetics. Subdivision geometry processing has seen rapid growth in the computer graphics community. In terms of geometry processing, subdivision offers several advantages including adaptivity, refinement, smoothness, etc. As a result, these salient features are inherited by physics solvers providing unprecedented accuracy, convergence, low frequency stability, etc.

21 Claims, 23 Drawing Sheets

US 10,102,319 B2

ELECTROMAGNETIC SCATTERING ANALYSIS MODULE USING SUBDIVISION BASED ISOGEOMETRIC ANALYSIS

CROSS-REFERENCE TO RELATED APPLICATIONS

This application claims the benefit of U.S. Provisional Application No. 62/193,628 filed Jul. 17, 2015. The entire disclosure of the above application is incorporated herein by reference.

GOVERNMENT RIGHTS

This invention was made with government support under CMMI 1250261 awarded by the National Science Foundation. The government has certain rights in the invention.

FIELD

The present disclosure relates to electromagnetic field analysis based on isogeometric analysis.

BACKGROUND

Computational methods have become the mainstay of scientific investigation in numerous disciplines, and including electromagnetics. Research in both integral equation and differential equation based methods has grown over the past few decades. In recent years, development in both higher order basis functions (e.g., 2, 3, 4, 5, 6) and higher order representations of geometry has increased.

Despite advances in these areas, there is a fundamental disconnect between processing a geometry of an object and performing an analysis based on the geometry. Traditional analysis proceeds by defining a discrete representation of the geometry typically comprising piecewise continuous tessellations. Ironically, this discrete representation of the geometry is obtained using software or a computer aided design (CAD) tool that contains a higher order differentiable representation of the geometry. The rationale for this disconnect is attributed to the different periods in time that CAD tools and analysis tools developed. As the latter is older, the computational foundation is older as well. As a result, one is left with awkward communication with the CAD software for refining and remeshing. This is especially true insofar as accuracy is concerned; lack of higher order continuity in geometry can cause artifacts if the underlying spaces for field representations are not properly defined. Indeed, the need to define div/curl conforming spaces on tessellations that are only $C_0$ led to development of novel basis sets that meet this criterion.

An alternate approach that has recently been espoused recently is iso-geometric analysis (IGA). In this approach, the basis functions used to present the geometry are the same as those used to represent the underlying functions. As a result, the features of geometry representation, such as higher order continuity or adaptivity, carry over to function representation as well. IGA has been applied to a number of applications that range from structure mechanics to fluid-structure interactions (FSI) to contact problems to flow to shell analysis to acoustics and electromagnetics. In addition to analysis techniques, the power of IGA has been harnessed for design-through-analysis phase in several practical applications.

While it may be possible to modify basis functions used for geometry construction to construct the necessary function space to represent the fields, most CAD tools use bi/tri-variate spline based patches/solids like those based upon Bezier, B-splines, and non-uniform rational B-splines (NURBS). As a result, these basis functions are often used as IGA basis, with the most popular being NURBS. The latter choice is determined by the fact that NURBS is the industry standard for modern CAD systems. Properties such as positively and the fact that it provides a partition of unity make it an excellent candidate for defining function spaces. Finite element methods based on NURBS basis functions that exhibit h- and p-adaptivity have been demonstrated. Unfortunately, the challenge with using NURBS arises from the fact that the resulting shapes are topologically either a disk, a tube, or a torus. As a result, stitching together these patches can result in surfaces that are not watertight. These complexities are exacerbated when the object being meshed is topologically complex or has multiple scales.

Two other geometry processing methodologies are T-splines and subdivision. The former is an extension to NURBS and can handle T-junctions and, hence, greatly reduce the number of the control points in the control mesh. T-splines, especially analysis-ready T-splines, comprise a good candidate for constructing isogeometric analysis.

As opposed to T-splines, subdivision surface has played a significant role in the computer animation industry. Among its many advantages is the ease with which one can represent complex topologies, scalability, inherently multiresolution features, efficiency, and ease of implementation. Furthermore, it converges to a smooth limit surface that is $C^2$ almost everywhere, except at isolated points where it is $C^1$. There are several subdivision schemes; Loop, Catmull-Clark, and Doo-Sabin to name a few. Generally speaking, all of the three of these schemes alluded to above can be used to construct an IGA method. To date, isogeometric analysis based on subdivision surface is not popular. Some work on IGA based on Catmull-Clark can be found where IGA is used to solve PDEs defined on a surface.

While the literature on IGA for differential equations is reasonably widespread across multiple fields, IGA for integral equations (IEs) is still at a nascent stage. As a result, it has recently become the focus of significant attention. Recently, the two-dimensional isogeometric boundary element method has been developed to study two-dimensional electromagnetic analysis.

This section provides background information related to the present disclosure which is not necessarily prior art.

SUMMARY

This section provides a general summary of the disclosure, and is not a comprehensive disclosure of its full scope or all of its features.

A method is presented for simulating fields on surface of an object. The method includes: receiving a polygon control mesh that represents surface of the object, where the polygon mesh defines a collection of points on the surface of the object and connectivity between the points; determining a geometric basis function that represents the surface of an object using the polygon control mesh; determining a scalar basis function that represents any scalar physical quantity on the surface of the object; determining a vector basis function that represents tangential fields on the surface of the object; constructing a discrete linear system for the object for finding the tangential fields on the surface due to an interrogating external field, where the linear system is derived from a surface integral equation and using the geometric basis function and the vector basis function; solving the discrete linear system for the tangential fields on the object; and determining fields at any given point in space using the tangential fields from the solved linear system.

In one example, the method can be applied to electromagnetic fields on surface of an electrically conducting object. In this example, the method includes: imaging surface of the object using a sensor; generating the polygon control mesh from the imaging data captured by the sensor, where the polygon control mesh represents surface of the object using either triangles or quadrilaterals and the polygon control mesh defines a collection of points on the surface of the object and connectivity between the points; determining a geometric basis function that represents the surface of an object, where geometric basis function is determined from the polygon control mesh using subdivision; determining a scalar basis function that represents any scalar physical quantity on the surface of the object; determining a vector basis function that represents current on the surface of the object; constructing a discrete electromagnetic system for the object for finding the tangential magnetic fields on the surface due to an interrogating electromagnetic field, where the electromagnetic system is derived from an electric field integral equation and using the geometric basis function and the vector basis function; solving the electromagnetic system for the tangential magnetic fields on the object; and determining fields at any given point in space using the tangential fields from the solved electromagnetic system.

In another aspect of this disclosure, a method is presented for determining a response along a surface of an object to different physical stimuli. This method includes: imaging the surface of the object using a sensor; generating a polygon control mesh from the imaging data captured by the sensor, where the polygon mesh represents surface of the object and the polygon mesh defines a collection of points on the surface of the object; determining a geometric basis function that represents the surface of an object, where geometric basis function is determined from the polygon control mesh using subdivision; associating a physical property with each point in the collection of points on the surface of the object; determining a physical basis function that represents the physical property along the surface of the object; constructing a discrete linear system for the object for finding a value of the physical property on the surface caused by an external stimuli, where the linear system is derived from the geometric basis function and the physical basis function; and solving the linear system to determine the values of the physical property on the surface of the object. By way of example, when the external stimuli is an acoustic wave, the physical property can be one of velocity potential or normal component of the velocity. When the external stimuli is a voltage, the physical property can be electric charge on the surface of the object. When the external stimuli is a force applied to the surface, the physical property can be displacement of the surface of the object. When the external stimuli is an electromagnetic field, the physical property can be one of electric current or magnetic current.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 9A:
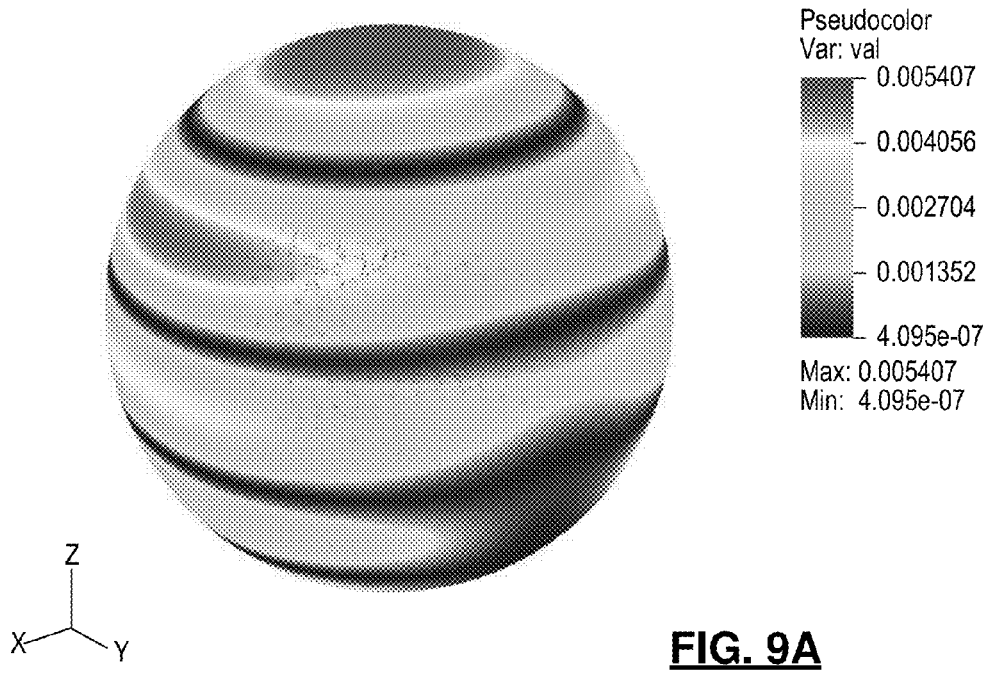
Figure 9B:
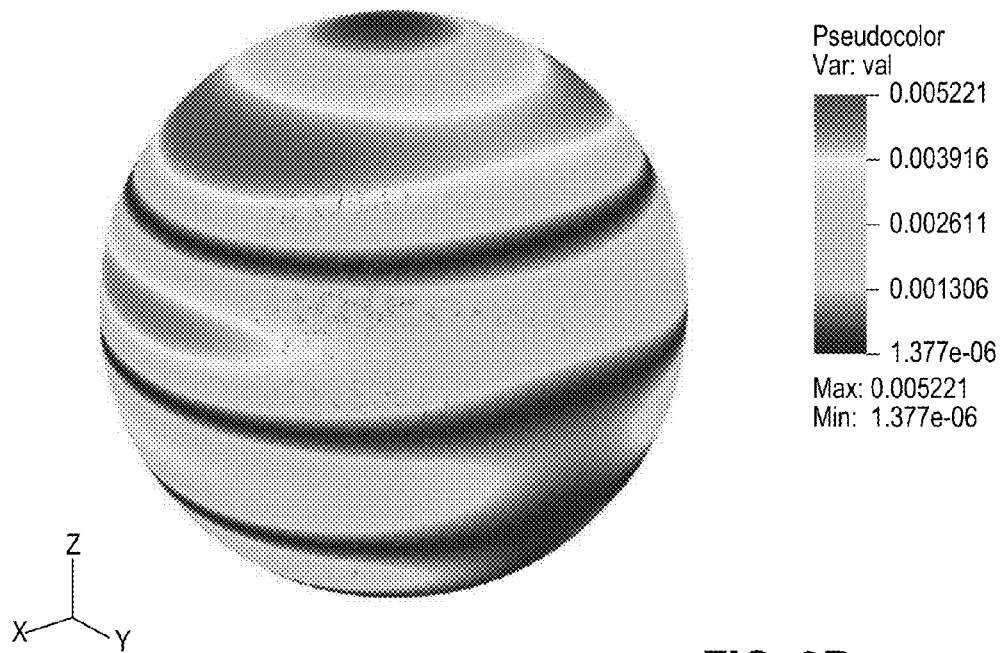
Figure 10:
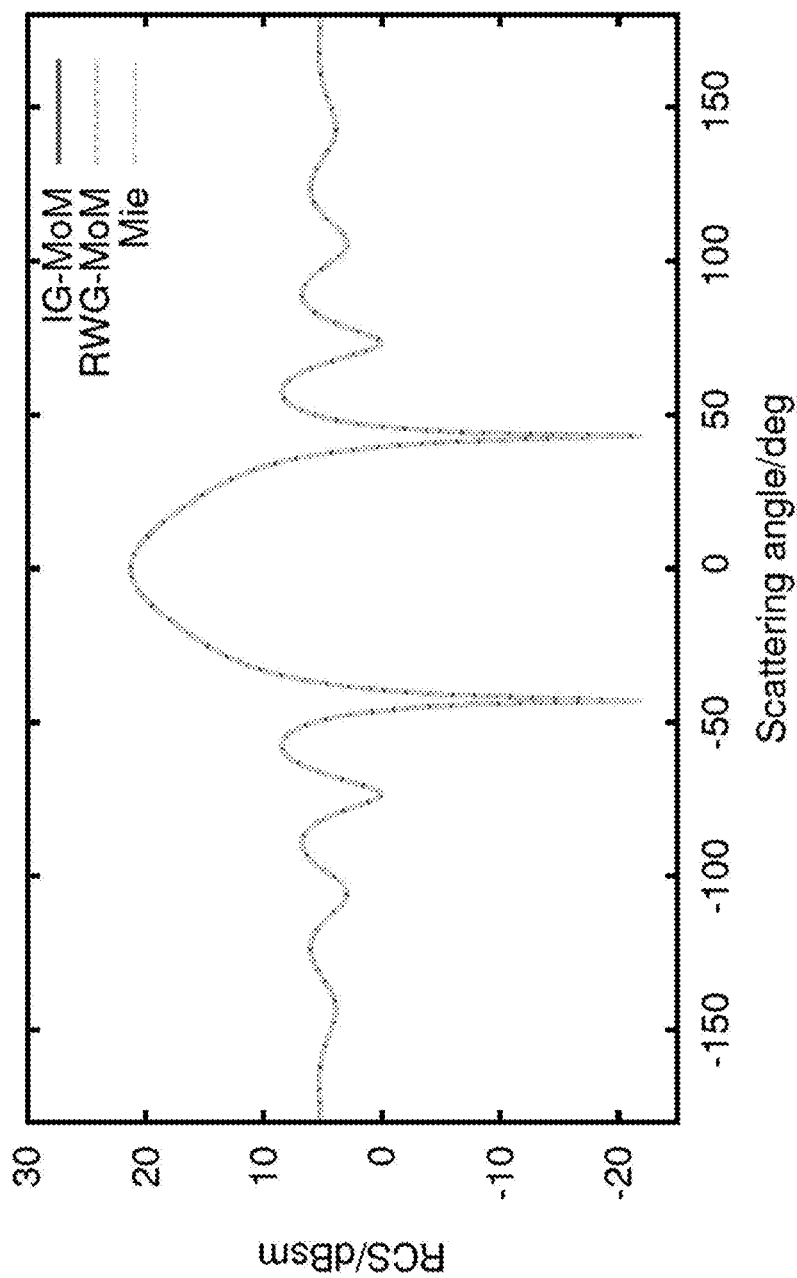
Figure 11A:
Figure 11B:
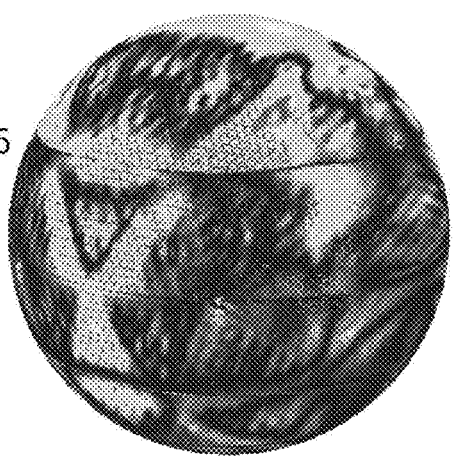
Figure 12A:
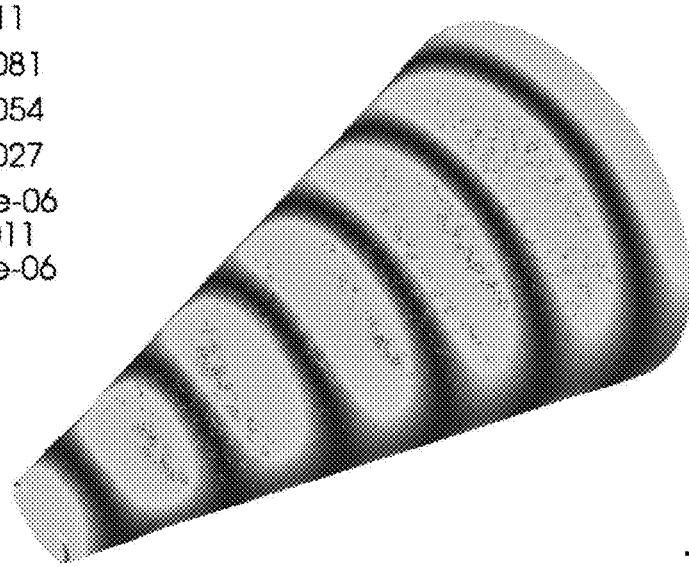
Figure 12B:
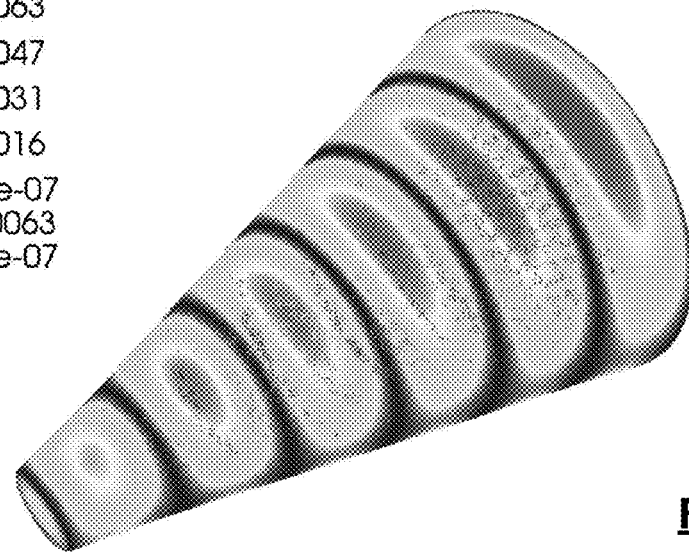
Figure 13:
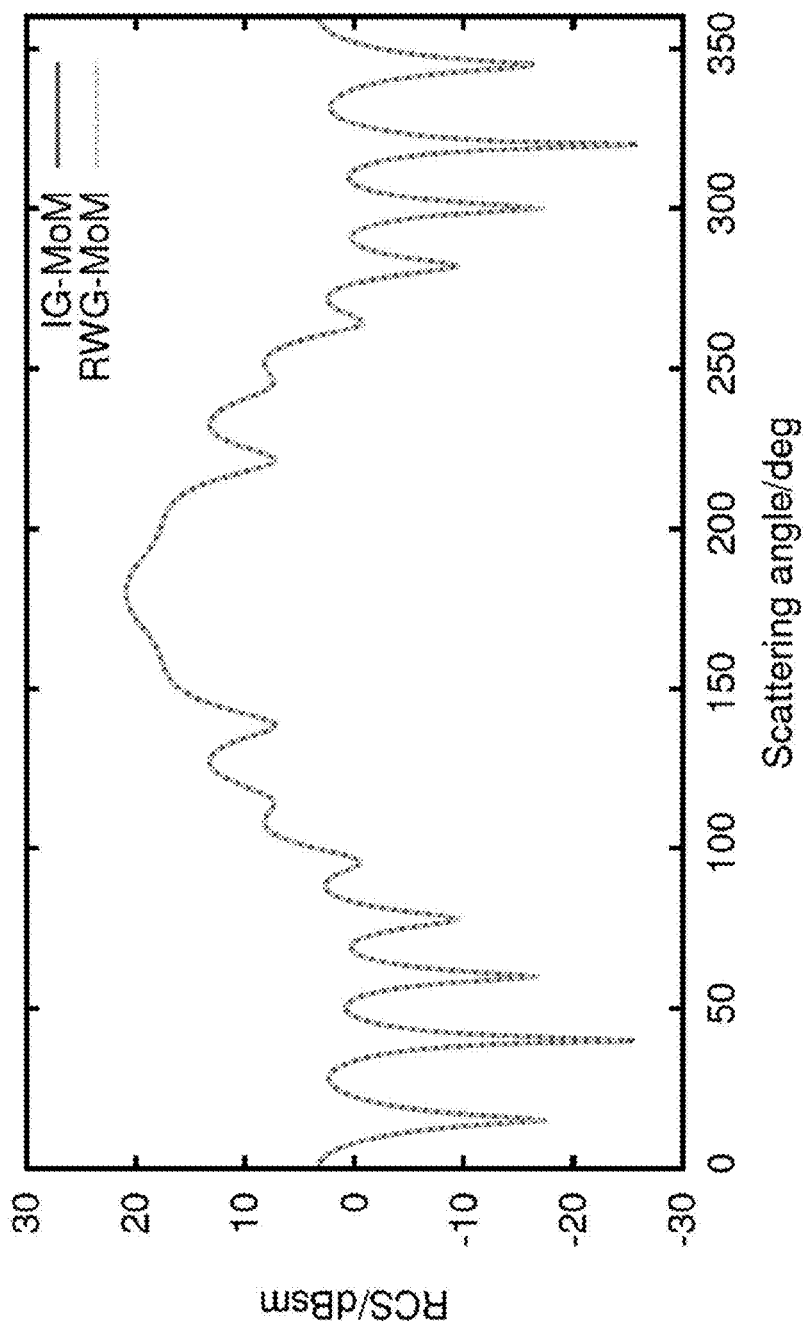
Figure 14A:
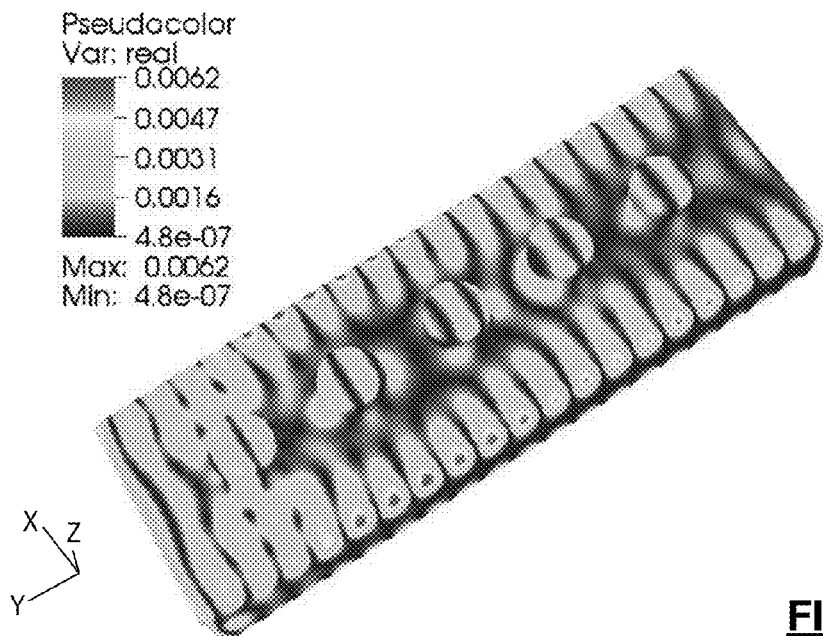
Figure 14B:
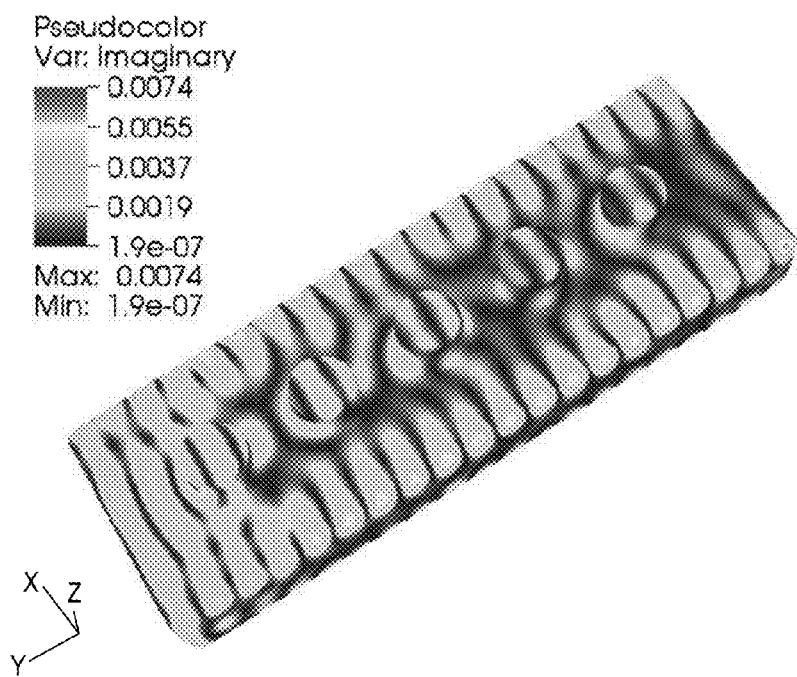
Figure 15:
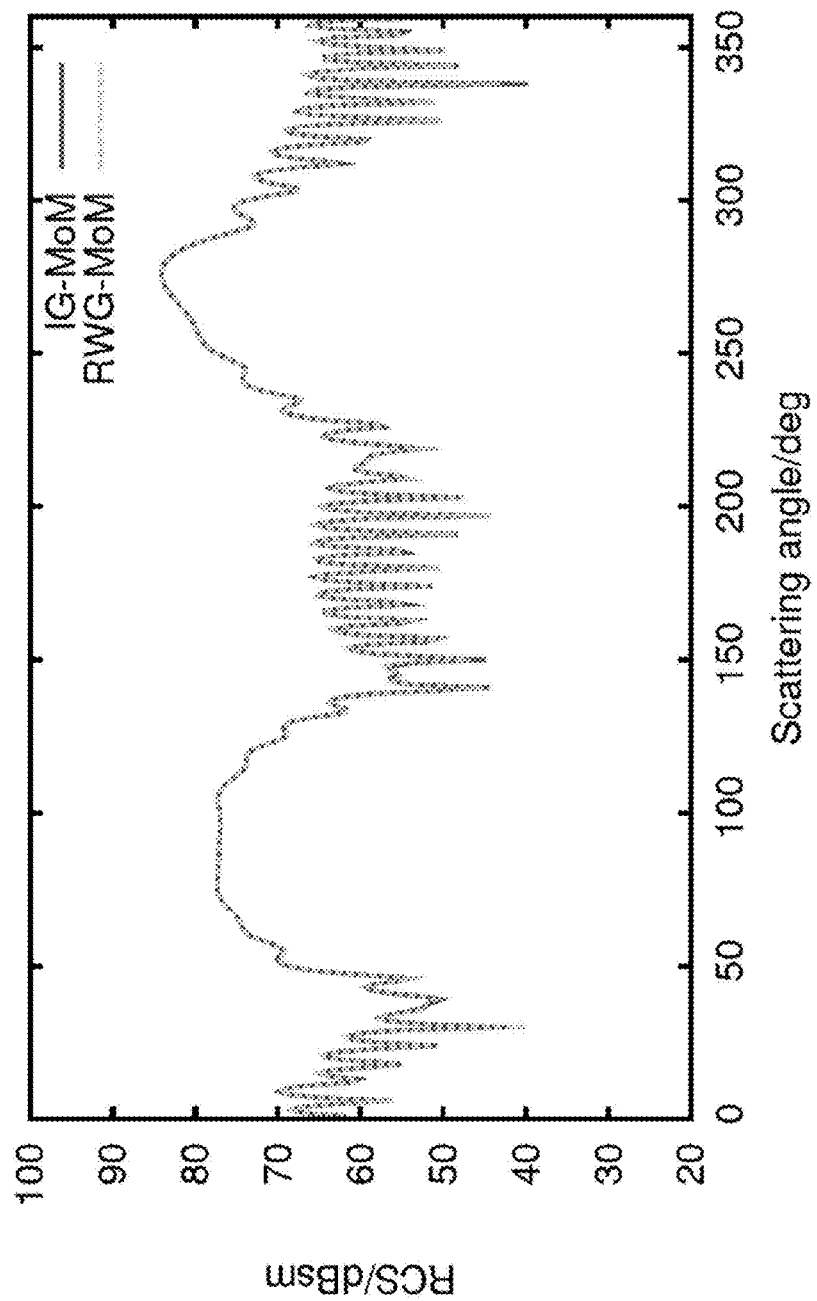
Figure 16A:
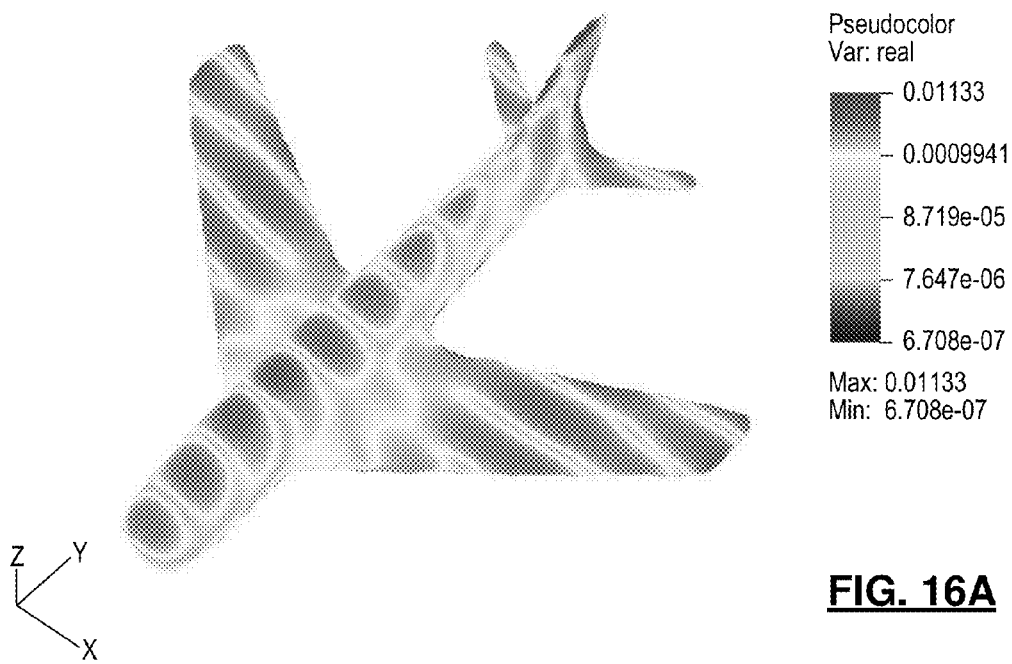
Figure 16B:
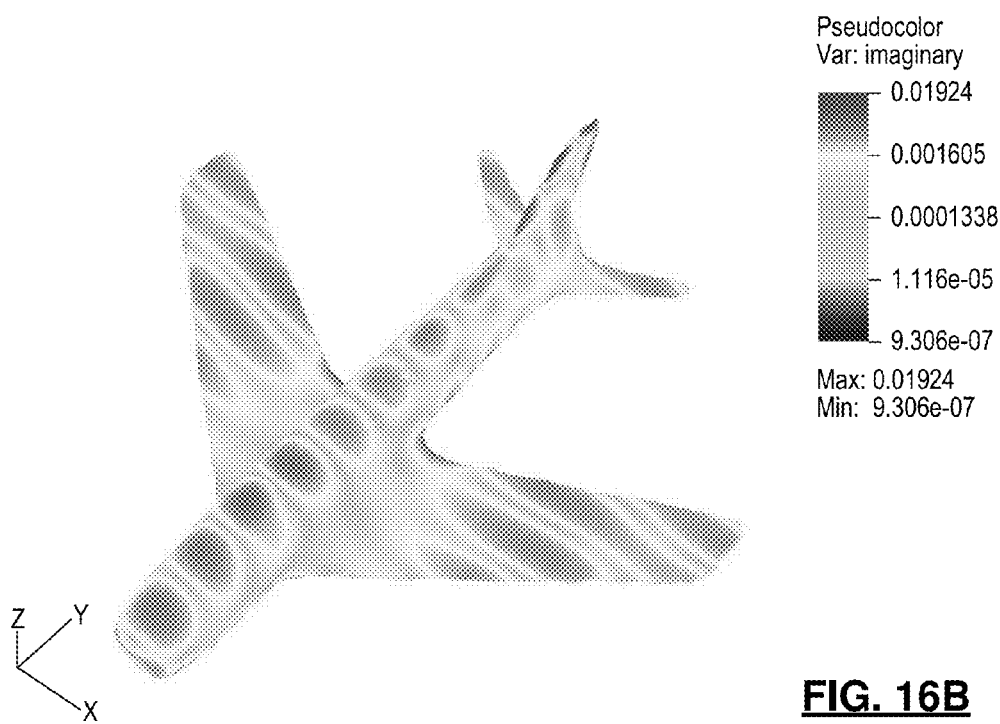
Figure 17:
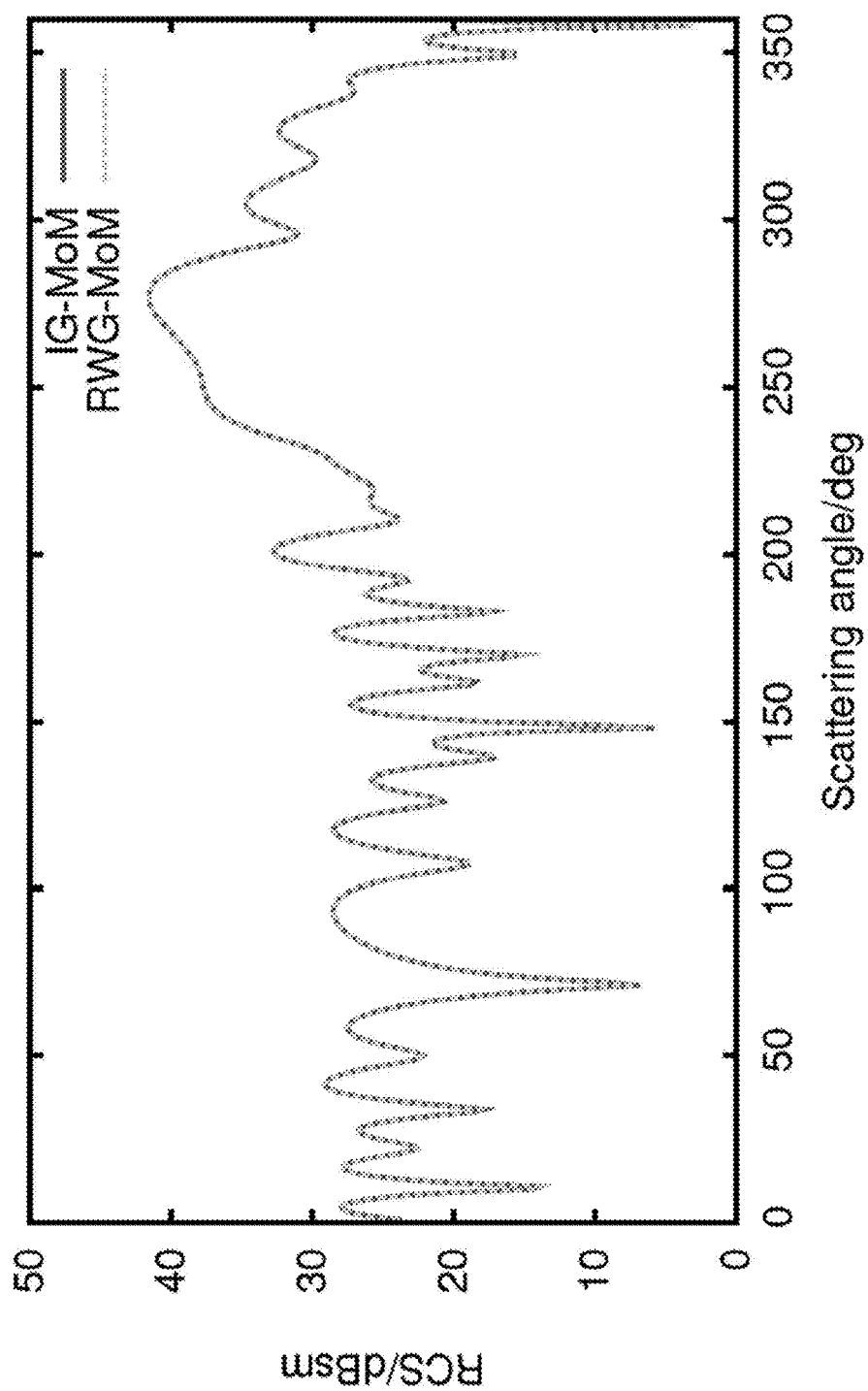
Figure 18:
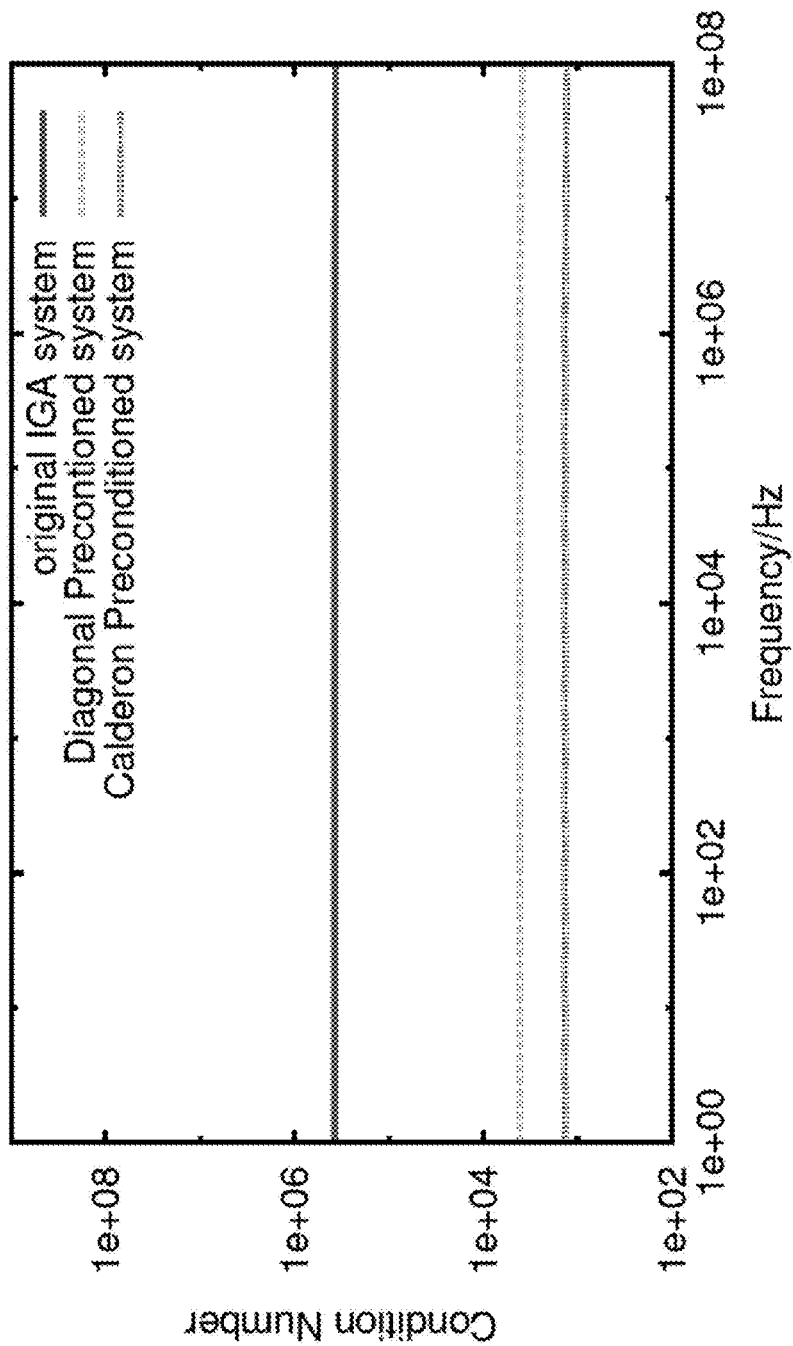
Figure 19:
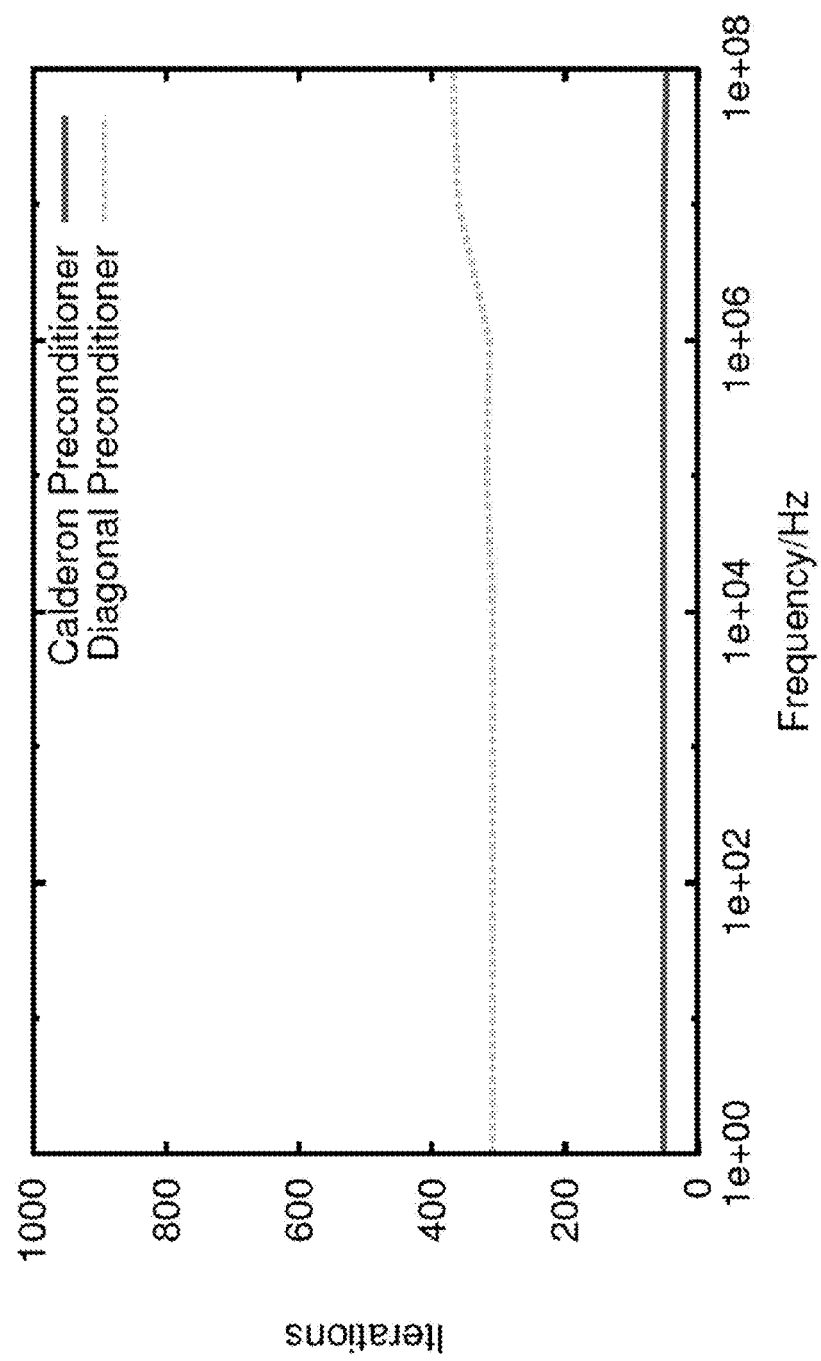
Figure 20:
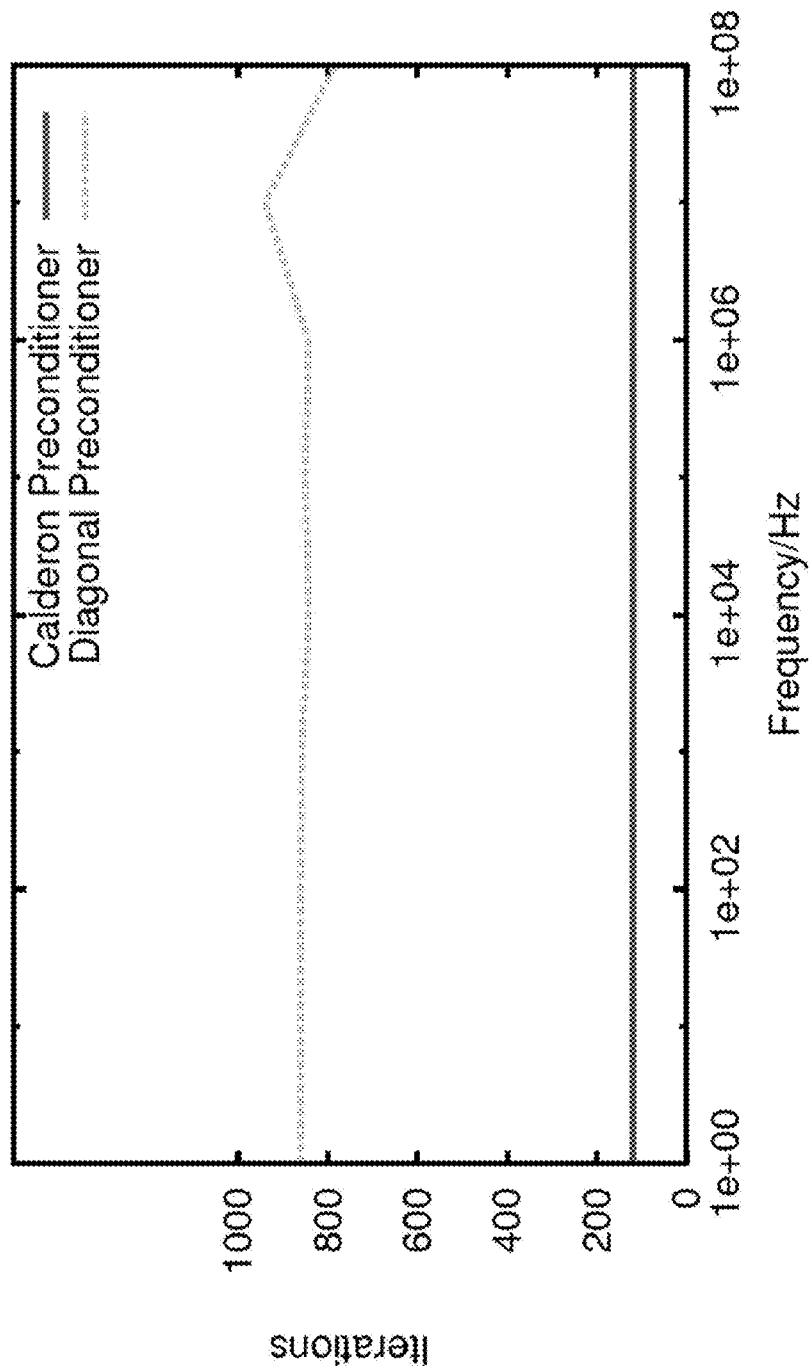
Figure 21:
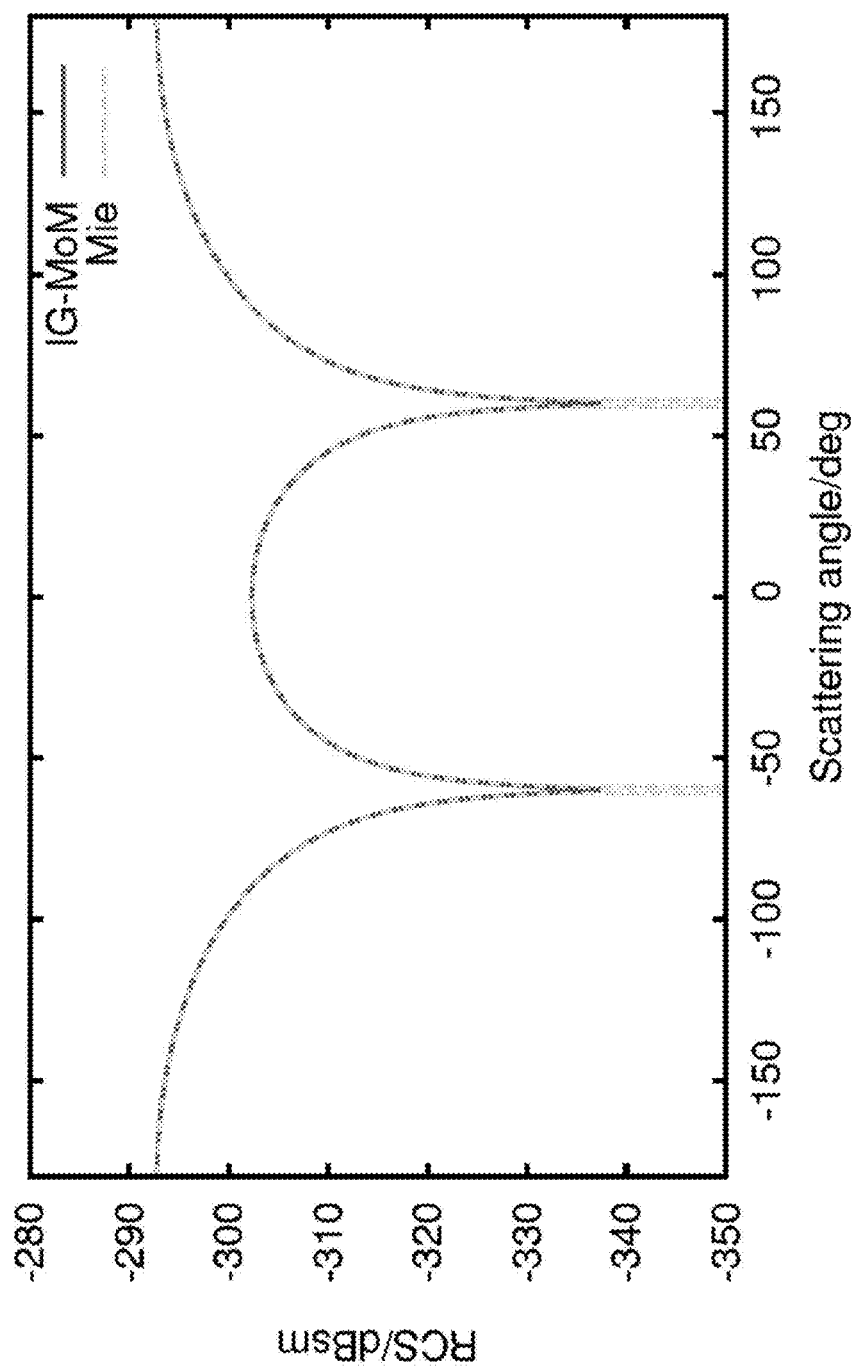
Figure 22A:
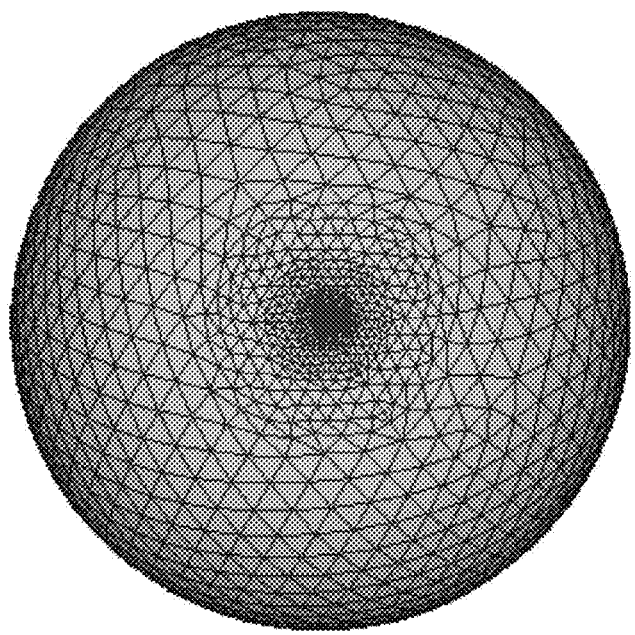
Figure 22B:
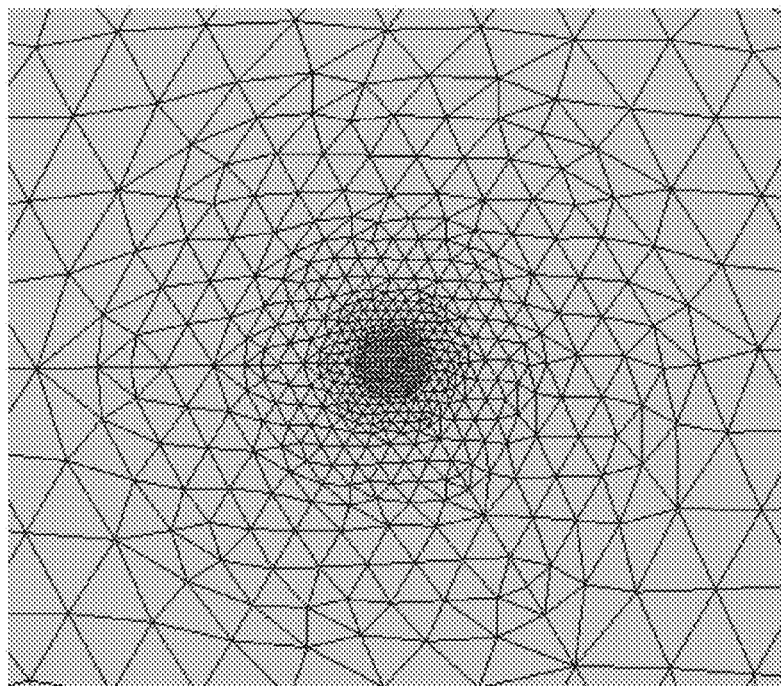
Figure 23:
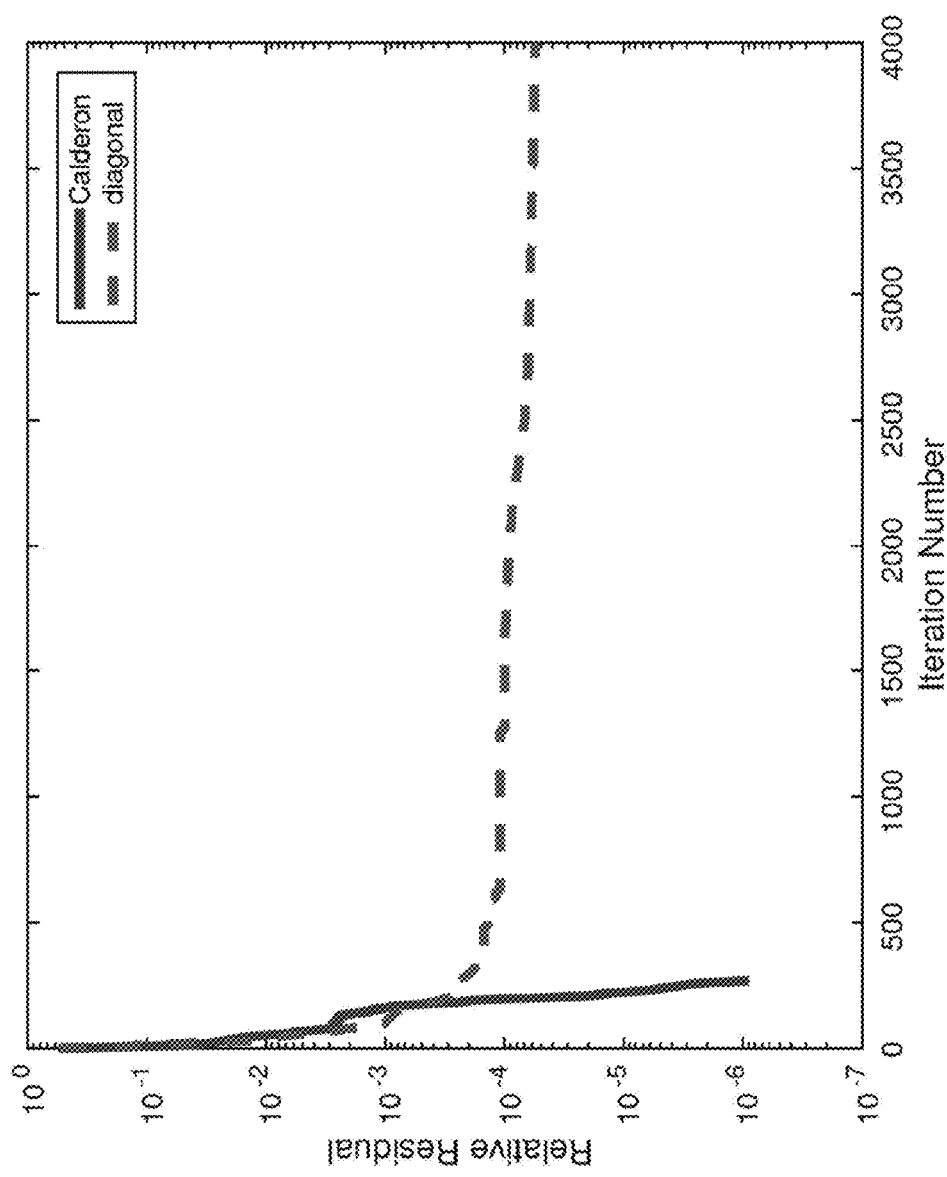
Figure 24:
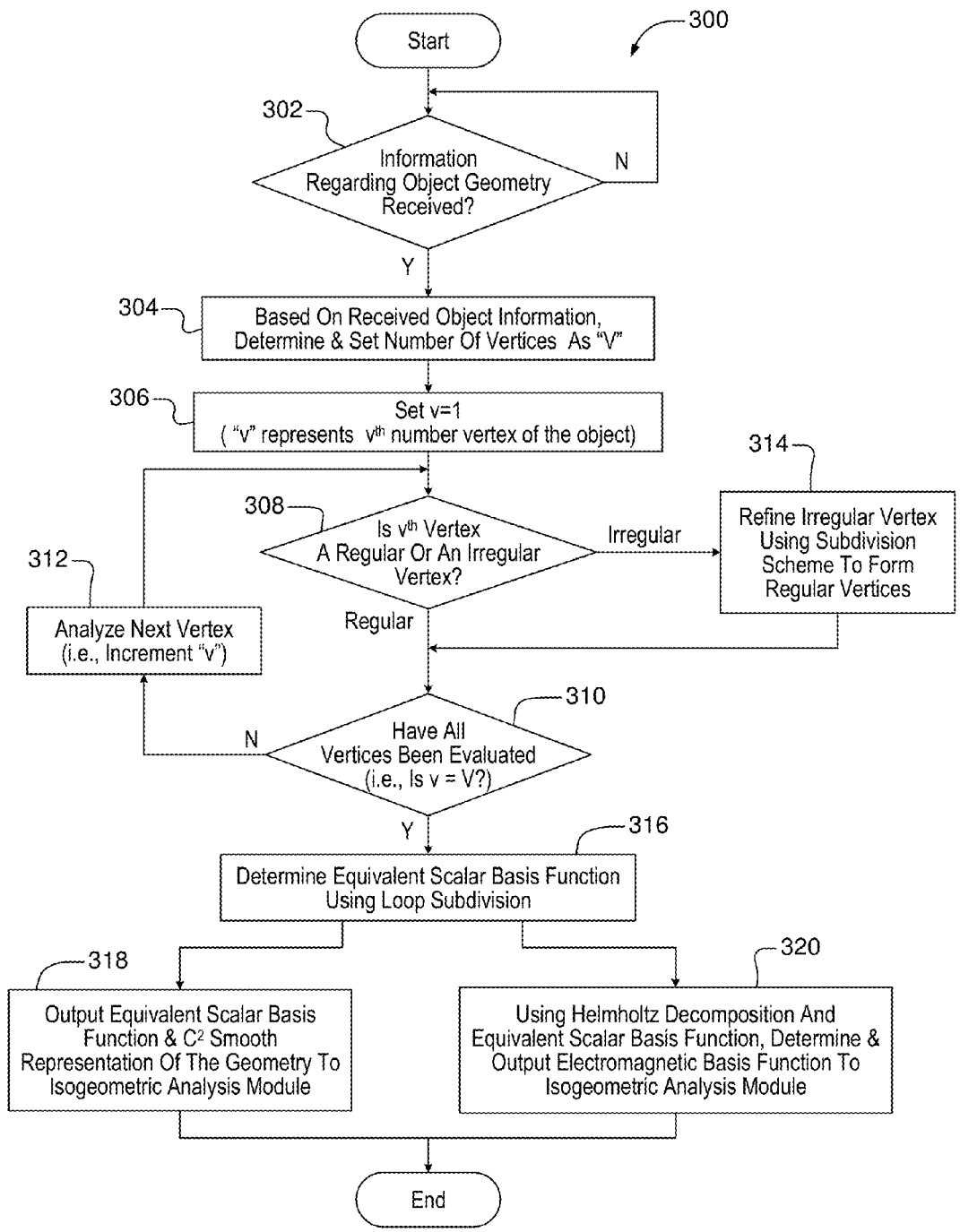
Figure 25:
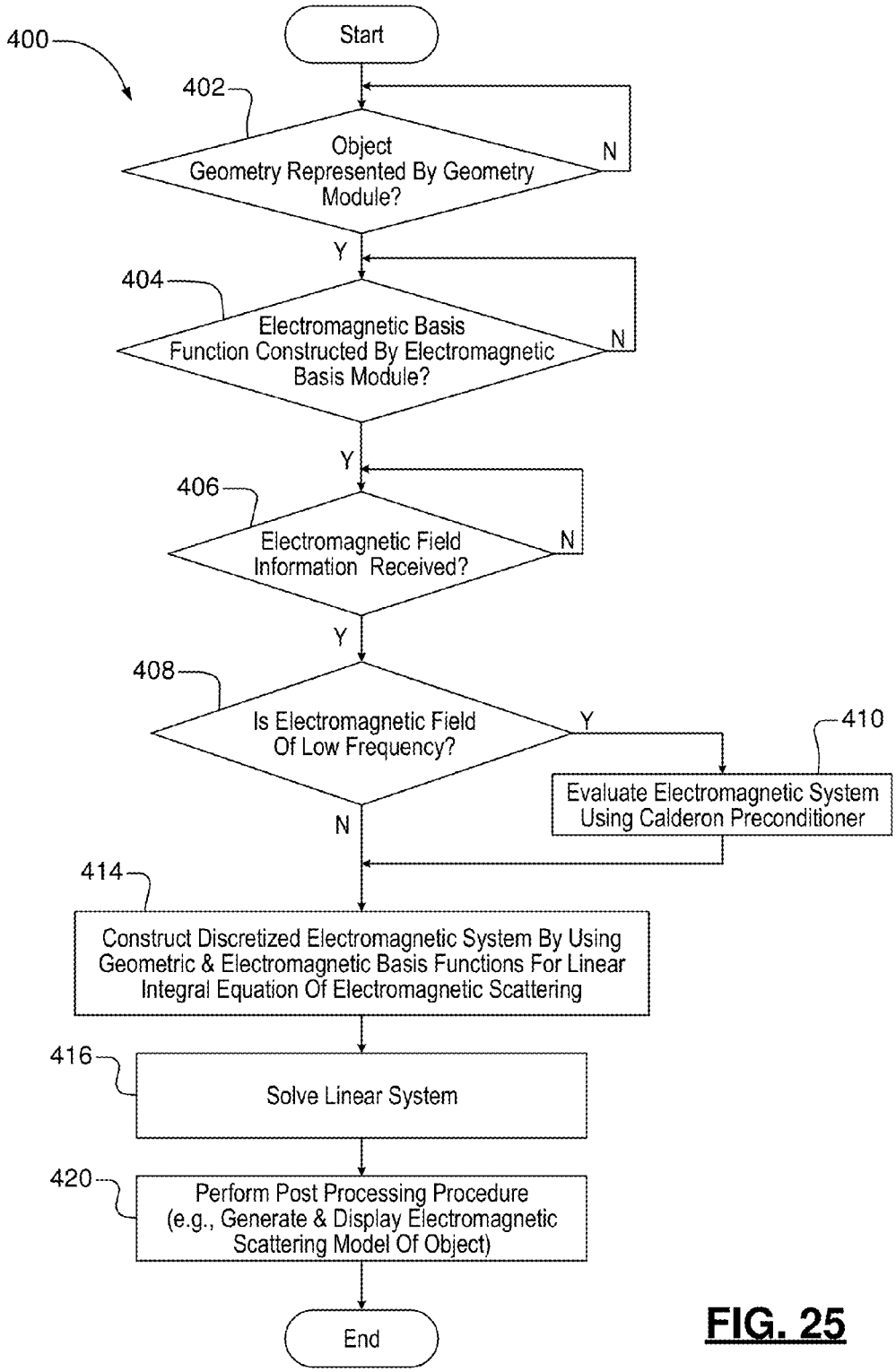

FIGS. 9(a) and 9(b) illustrate magnitude of surface currents density on a sphere for real and imaginary part, respectively;

FIG. 10 is a graph of a radar cross section of the sphere of FIGS. 9(a) and 9(b), where $\phi=0$ cut;

FIGS. 11(a) and 11(b) illustrate pointwise relative error of the sphere of FIGS. 9(a) and 9(b), respectively;

FIGS. 12(a) and 12(b) illustrate magnitude of surface currents density on a truncated cone for real and imaginary part, respectively;

FIG. 13 is a graph of a radar cross section of the truncated cone of FIGS. 12(a) and 12(b), where $\phi=0$ cut;

FIGS. 14(a) and 14(b) illustrate magnitude of surface currents density on a composite structure for real and imaginary part, respectively;

FIG. 15 is a graph of a radar cross section of the composite structure of FIGS. 14(a) and 14(b), where $\phi=0$ cut;

FIGS. 16(a) and 16(b) illustrate magnitude of surface currents density on an airplane model for real and imaginary part, respectively;

FIG. 17 is a graph of a radar cross section of the airplane model of FIGS. 16(a) and 16(b), where $\phi=0$ cut;

FIG. 18 is a graph of condition number at different frequencies;

FIG. 19 is a graph of generalized minimal residual iterative solver (GMRES) iterations to converge to a tolerance of $1.0 \times 10^{-6}$;

FIG. 20 is graph of GMRES iterations to converge to a tolerance of $1.0 \times 10^{-10}$;

FIG. 21 is graph that compares RCS data obtained at 1 Hz with analytical solutions;

FIG. 22(a) illustrates a multiscale control mesh;

FIG. 22(b) illustrates a locally refined region of the control mesh of FIG. 22(a);

FIG. 23 is a graph of convergence rate;

FIG. 24 is a flowchart of a basis function routine performed by the electromagnetic analysis module; and FIG. 25 is a flowchart of a linear system solver routine performed by the electromagnetic analysis module.

Corresponding reference numerals indicate corresponding parts throughout the several views of the drawings.

DETAILED DESCRIPTION

Figure 1:
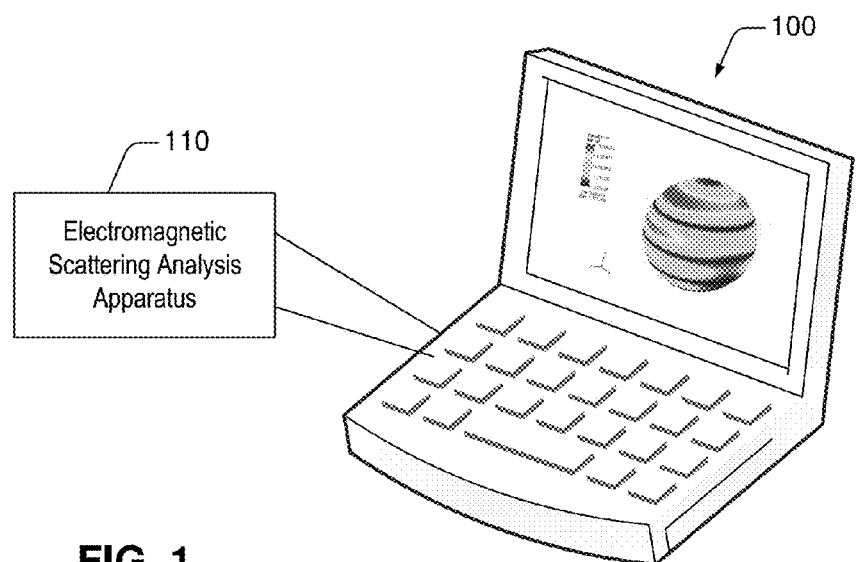
FIG. 1 illustrates a computing device including an electromagnetic scattering analysis module of the present disclosure.
Figure 2:
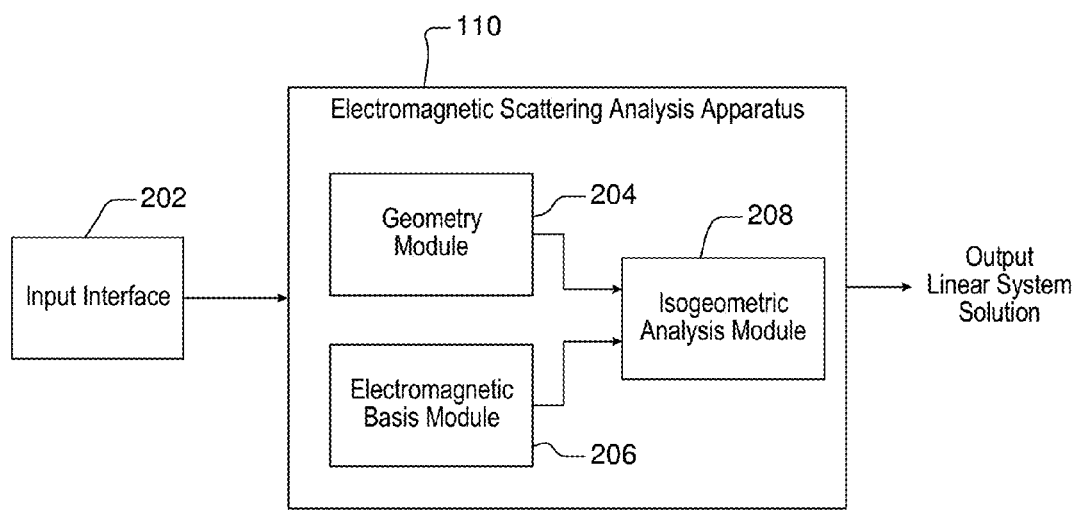
FIG. 2 is a block diagram of the electromagnetic scattering analysis module.

The present disclosure will now be described more fully with reference to the accompanying drawings. FIGS. 1 and 2 illustrate an electromagnetic scattering analysis (EMSA) module 100 that constructs and solves an electric field integral equation of an electrically conducting object using the principles described herein. The EMSA module 100 receives information regarding the object to be analyzed by way of an input interface 202. The input interface 202 includes one or more devices that are operable by a user. The input interface 202 may include a tablet, a peripheral device, a touchscreen, and/or other suitable device operable by a user to input data.

In one embodiment, the EMSA module 100 receives information regarding the geometry of the object and electromagnetic field incident upon the object. As a starting point, the surface of the object may be imaged using a sensor. The image data captured by the sensor is then used to generate the information regarding the geometry of the object. For example, the EMSA module 100 receives information indicating the basic structure of the object, the number of vertices that form the basic structure, the direction of incidence of the electromagnetic field, the frequency of the electromagnetic field, and the polarization direction of the electromagnetic field. In another example, the EMSA module receives a polygon control mesh that represents the surface of the object using either triangles or quadrilaterals, where the control mesh defines a collection of points on the surface of the object and connectivity between the points. The control mesh may also feature other features as is known in the art.

The EMSA module 100 includes a geometry module 204, an electromagnetic basis module 206, and an isogeometric analysis module 208. The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

Using the geometric information of the object from the input interface 202 and predefined algorithms defined below, the geometry module 204 determines a geometric basis function to represent the surface of object and the electromagnetic basis module 206 determines an electromagnetic basis function to represent electromagnetic quantities on the surface. The geometry module 204 also determines a $C^2$ smooth geometric representation of the object. Using the basis functions from the geometry module 203 and the electromagnetic basis function from the electromagnetic basis module 206, the isogeometric analysis module 208 constructs and solves a linear system. Specifically, the isogeometric analysis module 208 solves a linear system stemming from discretizing an electric field integral equation (EFIE).

In developing a linear system solver that is robust, several challenges need to be addressed; these range from definition of basis functions that correctly map the trace of fields on the surface to formulations that render the resulting system frequency stable to formulation of effective preconditioners.

To set the stage for introduction of this formulation, it is assumed that the surfaces are simply connected and have $C^2$ smoothness almost everywhere. The assumption of sufficient "local" smoothness permits significant freedom in terms of defining function spaces. The present disclosure: (i) presents construction of a basis to correctly represent the trace fields on surface with genus equal to zero; (ii) demonstrates convergence of EFIE-IGA solver for canonical geometries as well as presents applications for complex targets; (iii) demonstrates stabilization of EFIE-IGA solvers using the proposed in basis sets together with frequency scaling; (iv) demonstrates construction of the Calderón preconditioner using the proposed basis sets without the need for auxiliary barycentric meshes; and (v) presents scattering data from multiscale obstacles.

The present disclosure is organized into four sections. Section 1 outlines the integral equations to be solved. Section 2 presents a brief summary of extant literature on subdivision surfaces. Section 3 details: (i) the definition of basis functions, (ii) addressing low frequency breakdown, and (iii) Calderón preconditioners for the EFIE. Section 4 presents several numerical results that verify the utility of this approach.

1. Integral Equations for Electromagnetic Scattering

The EMSA module 100 analyzes a perfect electrically conducting object that occupies a volume C) whose surface is denoted by $\partial\Omega$. It is assumed that this surface is equipped with an outward pointing normal denoted by $\hat{n}(r)$. The region external to this volume ($\mathbb{R}^3\backslash\Omega$) is occupied by free space. It is assumed that a plane wave characterized by $\{E^i(r), H^i(r)\}$ is incident upon this object. The scattered field for $r \in \mathbb{R}^3\backslash\Omega$ is obtained using equivalence theorems (1a) and (1b):

$$\hat{n}(r) \times E^s(r) = \Gamma \circ J(r)$$

$$\hat{n}(r) \times H^s(r) = K \circ J(r) \quad (1a)$$

where $$\Gamma \circ J(r) \doteq -j\omega\mu_0 \hat{n}(r) \times \int_{\partial\Omega} dr' \times \left[I + \frac{1}{k^2}\nabla\nabla\right] g(r,r') \cdot J(r') \quad (1b)$$

$$K \circ J(r) \doteq \hat{n}(r) \times \nabla \times \int_{\partial\Omega} dr' g(r,r') J(r)$$

where $g(r,r') = \exp[-jk|r-r'|]/(4\pi|r-r'|)$, k is the wave number in free space, $J(r)$ is the equivalent current that is induced on surface, and $\tau$ is the idempotent.

In the above expression, and in everything that follows, it is implicitly assumed and suppressed an $\exp[jwt]$ time dependence. Using the above equations, an electric field integral equation (EFIE) and a magnetic field integral equation (MFIE) are provided as:

EFIE: $\hat{n}(r) \times (E^i(r) + E^s(r)) = 0 \forall r \in \partial\Omega$ (2a)

MFIE: $\hat{n}(r) \times (H^i(r) + H^s(r)) = 0 \forall r \in \omega\Omega^-$ (2b)

In equation (2b), $\partial\Omega^-$ denotes a surface that is conformal to but just inside $\partial\Omega$. These equations do not have unique solutions at the so-called irregular frequencies, but may be combined to yield the combined field integral equation that gives unique solutions at all frequencies. It should be noted that while these equations are commonly used in practice, they are not the only ones. Other formulations such as the combined source integral equation, augmented EFIE, augmented MFIE, and the charge current integral equation, exist and fall within the scope of this disclosure. The present disclosure will focus on the EFIE and its discretization. The choice is largely motivated by the numerous challenges that exist in solving these equations, both at the mid and low frequency regimes. As described further below, basis functions are formulated to account for both low frequency behavior and to impose Calderón preconditioners.

Methods for solving equations (2a) and (2b) include the following steps: (i) represent the surface of the scatterer using some tessellation, (ii) define basis function on this approximation to the geometry, (iii) demonstrate desirable properties of these basis sets, and (iv) validate solutions to integral equations solved using this procedure. As opposed to classical tessellation, subdivision surfaces are used for geometric representation.

2. Subdivision Surfaces

A brief overview of shape description as effected by subdivision surfaces is presented. The traditional workhorses of geometric description are NURBS. As a result, current isogeometric methods have been largely developed using NURBS as basis functions. However, a singular feature stands out that poses to be a bottleneck-while NURBS descriptions are $C^2$ in the interior of a patch, the continuity may be $C_0$, or even worse (not watertight), at the boundary between patches or at intersection curves. As a result, one has to define physical basis functions that are div-conforming (or curl-conforming) for vector problems. This stands in contrast to subdivision surfaces that are constructed as limit surfaces obtained by subdivision processes. This leads to meshes that are $C^2$ almost everywhere, except at isolated points. The material described next is a summary of subdivision surfaces.

Figure 3A:
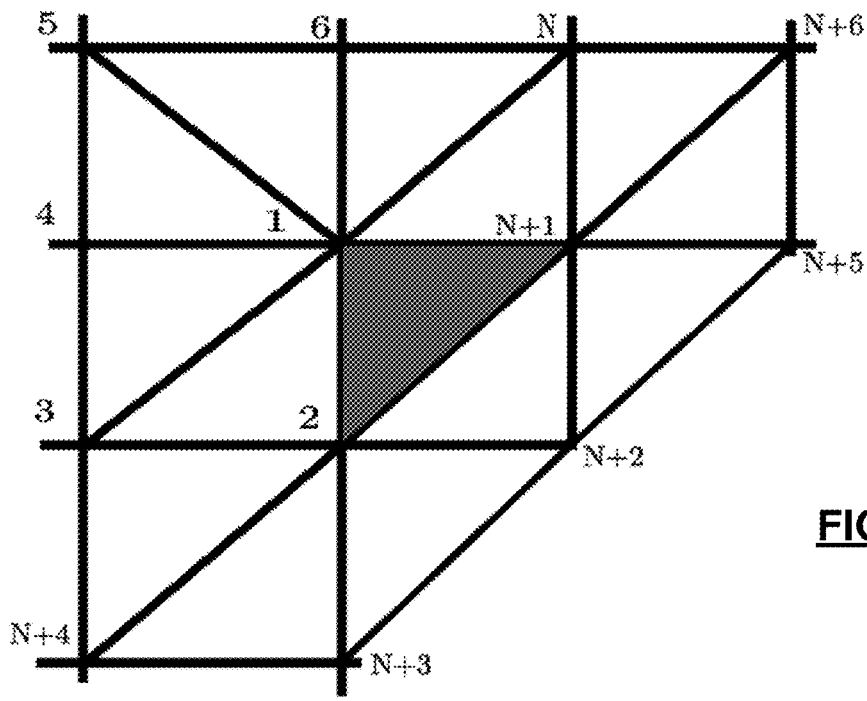
FIG. 3(a) illustrates an irregular triangle with a vertex having valence-7.
Figure 3B:
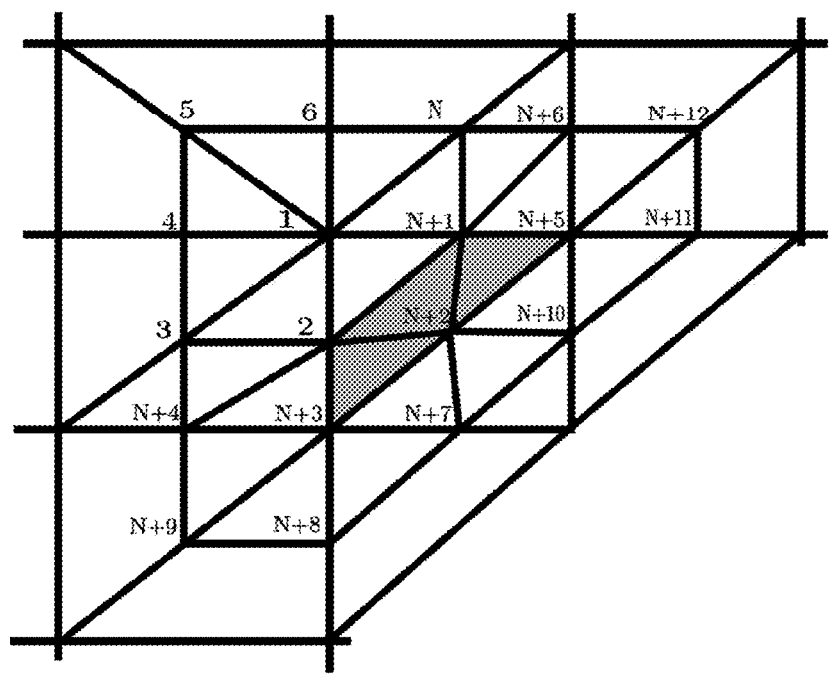
FIG. 3(b) illustrates a subdivision of the irregular triangular of FIG. 3(a)

As triangular tessellation is ubiquitous in computational electromagnetics, the choice of the presentation below is based on the Loop subdivision scheme for closed triangular surface meshes. Let $M_0$ denote the primal base mesh that leads to the limit surface. As in any tessellation, $M_0$ comprises a set of vertices V and a connectivity map. The 1-ring union of incident triangles of a vertex produced by the connectivity map can be characterized by the valence of the vertex; specifically, (i) a valence-6 node/vertex is deemed regular and (ii) any other vertex is called extraordinary or irregular. A triangle is regular if all its vertices are regular, and irregular otherwise. FIG. 3(a) illustrates an irregular triangle, and FIG. 3(b) illustrates a subdivision around the irregular vertex.

Figure 4:
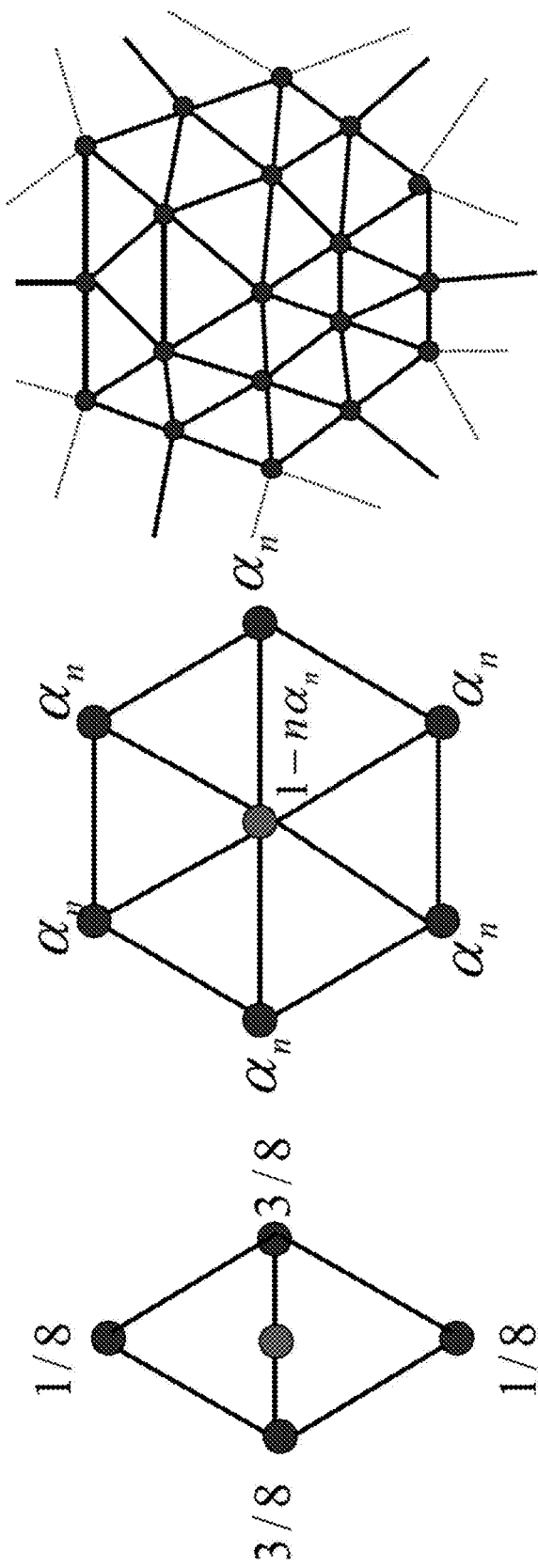
FIG. 4 illustrates a local averaging during refinement of an irregular triangle.

The Loop subdivision scheme defines a smooth surface approximating positions assigned to each vertex in the base mesh through a procedure. FIG. 4 illustrates local averaging for Loop subdivision. Starting from the base mesh, an infinite sequence of meshes is determined through repeatedly refining the k-th mesh into the (k+1)-th mesh by dividing each triangle into four subtriangles by inserting one vertex per edge and adjusting vertex locations. The location of the existing vertex is an affine combination of its one-ring vertices with weight $$\alpha_n = \left(\frac{5}{8} - \left(\frac{3}{8} + \cos\left(\frac{2\pi}{n}\right)\right)/4\right)^2 / n,$$

and itself with weight $1-n\alpha_n$, where n is the valence. The location of the newly inserted vertex is an affine combination of the end vertices of the edge, each with weight ⅜, and the other two vertices of the two incident triangles, each with weight ⅛. The limit of the sequence of piecewise flat surface is the Loop subdivision surface with $C^2$ smoothness almost everywhere, except at the extraordinary vertices, where it has $C^1$ smoothness. Note, the newly inserted vertices will always be regular (valence-6). Thus, it can be assumed that extraordinary vertices are at least two edges away from each other, otherwise the base mesh is replaced by the mesh obtained after proceeding through the subdivision process once.

The same procedure through repeated refinement with local averaging can be used to define smooth functions on the Loop subdivision surface. In the context of isogeometric analysis, it is perhaps useful to view this process in terms of effective basis functions. Consider the limit surface S $(u,v)=\Sigma_{i\in v} x_i \xi_i(u,v)$ that is defined by coordinates of the vertices $x_i$, and $\xi_i(u,v)$ is an effective basis function that is associated with quantities associated with vertex i, and (u,v) are the pairwise coordinates on a parameterization chart. For instance, $\xi_i(u,v)$ can be constructed by the subdivision procedure starting with 1 assigned to $(u_i,v_i)$ and 0 assigned to all other vertices.

Figure 5:
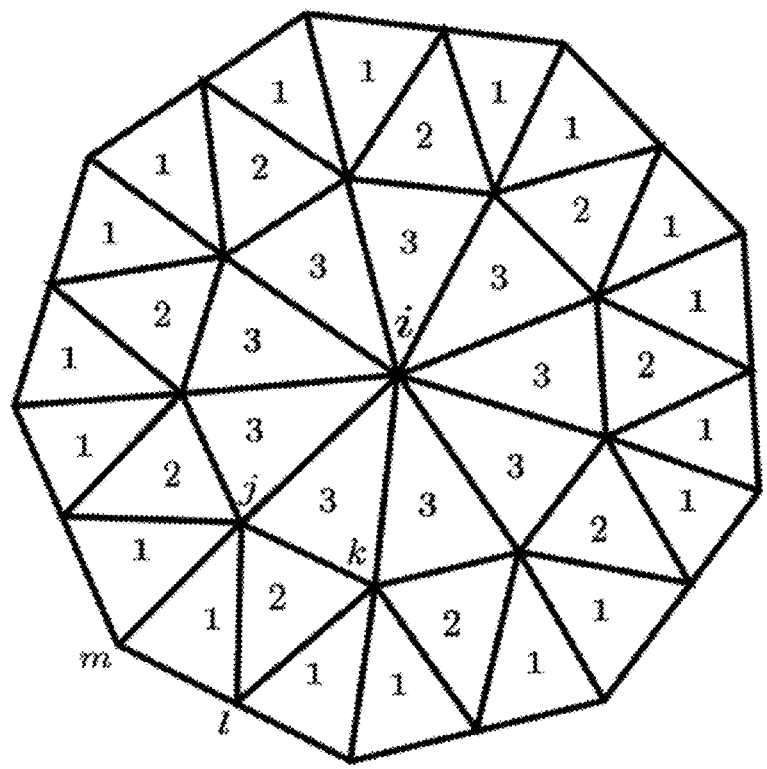
FIG. 5 illustrates 2-rings of a valence-k vertex, where k=9.

Such a basis function $\xi_i$ has a compact support, as it is 0 outside $V_i$'s 2-ring (union of the 1-rings of the I-ring vertices). Piecewise-linear parameterizations of the base mesh can be used as a parameterization of the subdivision surface. In a parameterization chart (u,v), it can be shown that for any vertex $V_i, \xi_i(u,v))$ can be expressed in closed form as the 3-direction quartic box spline $N_i(u,v)$, if (u,v) is located within a regular triangle. In FIG. 5, for triangles incident to $V_i$, (triangles labeled 3 in FIG. 5), e.g., triangle $T_{ijk}$, denoting the linear basis function (hat function) of $V_i$, by $\varphi_i(u,v)$ and setting $r=\varphi_i, s=\varphi_j$, and $t=\varphi_k$ (note that r+s+t=1), $$N_i(u,v)=6r^4+24r^3t+24r^2t^2+8rt^3+t^4+24r^3s+60r^2st+36rst^2+6st^3+24r^2s^2+36rs^2t+12s^2t^2+8rs^3+6s^3t+s^4.$$

For triangles with 2 vertices in the 1-ring of V. (triangles labeled 2 in FIG. 5), e.g., triangle $T_{ijk}$, setting $r=\varphi_j, s=\varphi_l$, and $t=\varphi_k(u,v)=r^4+6r^3t+12r^2t^2+6rt^3+t^r+2r^3s+6r^2st+6rst^2+2st^3$.

For triangles with one vertex in the I-ring of $V_i$ (triangles labeled 1 in FIG. 5), e.g., triangle $T_{jml}$, setting $r=\varphi_j$ and $t=\varphi_l, N_i(u,v)=r^4+2r^3t$.

For an irregular triangle $T_{ijk}$ with $V_i$ being extraordinary, the evaluation of $\xi_l$ for $V_l$ in the one-ring of $V_i$, $V_j$ or $V_k$ is modified. If $\varphi_i(u,v)=1$, the evaluation is right at the extraordinary vertex with valence n, where it can be shown that $$\xi_l(u, v) = \left(\frac{1}{\frac{3}{8\alpha_n} + n}\right)$$

for $V_l$ in $V_i$'s 1-ring, and $$\xi_i(u, v) = 1 - \frac{n}{\left(\frac{3}{8\alpha_n} + n\right)}.$$

Figure 6:
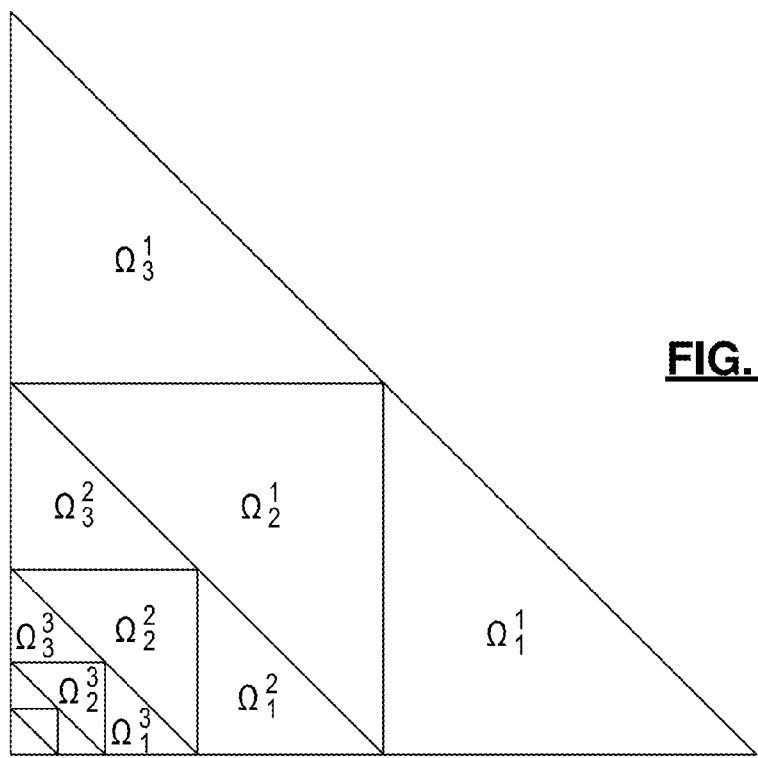
FIG. 6 illustrates a parameter domain within a triangle that is partitioned into an infinite number of subdomains.

Otherwise, when $2^{-k}<\varphi_i(u,v)\leq 2^{-(k-1)}$, the point belongs to $\Omega_1^k$ in FIG. 6, if $\varphi_j(u,v)>2^{-k}$, to $\Omega_3^k$ if $\varphi_k(u,v)>2^{-k}$, or to $\Omega_2^k$ otherwise. It means that after k-th subdivision, the basis functions $(\xi_i,\xi_j,\xi_k)$ can be evaluated through linear combinations of box splines with values on the relevant vertices after k-th subdivision, since $\Omega_m^k$ is a regular triangle after k-th subdivision.

The relevant values for each $\Omega_m^k$ can be stored in a vector $E_{k,m}$ containing 12 scalars, one for each vertex whose box spline basis function has the triangle in its support, which can be calculated as $E_{k,m}=P_m \bar{A} A^k E_0$, where $E_0$ is the initial assignment of the n+6 vertices in FIG. 3(a), which is 1 for $V_l$ when evaluating $N_l$, and 0 for any other vertex; A is the subdivision operator matrix, an $(n+6)\times(n+6)$-matrix denoting how the values influencing the irregular triangle in the next level are calculated from the values at the current level (FIG. 3(b) shows the vertex at the next level with the edges in the current level as dash lines); $\overline{A}$ is an extended version of A including how the vertices n+7 through n+12 of next level are computed form the current level; $P_m$ is the picking matrix selecting the relevant 12 values for $\Omega_m^k$ within the n+12 values. Note that, in practical implementation, eigenanalysis of A is performed so that the evaluation involves taking powers of the eigenvalues as an efficient way of handling the calculation of $A^k$. Furthermore, the subdominant eigenvectors provide a means for direct evaluation of derivatives even in irregular triangles.

Several properties of these basis functions are worth noting as they are critical for representing both the geometry as well as the physics defined on the geometry. These properties include the following: compact support, nonnegativity, convexity preserving property, and $C^2$ continuity across patch boundaries. These properties make the box splines a good approximating shape functions on both regular and irregular with the help of subdivision scheme triangular meshes. Note that some of these properties are available for a NURBS description as well in the interior of the element, and not necessarily across domains.

3. Current Representation and Field Solvers 3.1. Isogeometric Basis Sets

Section 2 developed a framework wherein one dealt with representation of the limit surface. Using the same unified representation as that presented above, the concept of scalar functions that are defined on the limit surface is introduced. As alluded to earlier, the "limit" function can be represented in terms of king control weights of a regular triangle, and the box splines as defined on the limit surface.

$$f(r)=f(r(u,v))=\Sigma_{i=1}^{12}N_i(u,v)w_i; \text{ for } r\in T \quad (3)$$

In equation (3), it is assumed that the mapping $r(u,v)$ exists, where $(u,v)$ are the barycentric coordinates of a triangle. In what follows, this assumption will be implicit, and only r will be used. It can be readily verified that if only one vertex has a weight of unity and other zeros, one would immediately get a smooth up to $2^{nd}$ order continuity globally scalar function. As a result, one can associate an effective basis function with every vertex such that the following function is realized:

$$f(r) = \sum_{n=1}^{N_v} a_n \xi_n(r) \quad (4)$$

In equation (4), $N_v$ is the number of vertex and $\xi_n(r)$ is an effective basis function that describes the influence of the scalar quantities associated with a vertex. This resembles the definition of the surface wherein the quantities defined at the vertex are the locations themselves.

The equivalent scalar basis function can be used to represent different kinds of physical properties defined on the surface of an object. The procedure is very similar to that of representing smooth surface of the object. First, one needs to associate the physical property of interest with each vertex in the control mesh. Then, the value of the property at any point on the surface can be obtained through equation similar to eq. 4, by carrying out the weighted summation. For instance, in acoustics one associates velocity potential and/or normal component of the velocity with each vertex. The boundary integral equation for acoustic fields can then be cast in terms of either the velocity potential or the normal component of the velocity. Using the scalar basis as alluded to earlier and Galerkin testing, one can then create an isogeometric methodology that can solve for sound scattering/propagation. Likewise, the same set of ideas can be extended to elastodynamics where the scalar basis is associated with a displacement field. Again using these basis functions in the requisite integral equations within Galerkin scheme enables analysis of elastodynamic phenomena. Other types of physical properties are also contemplated by this disclosure.

Figure 7A:
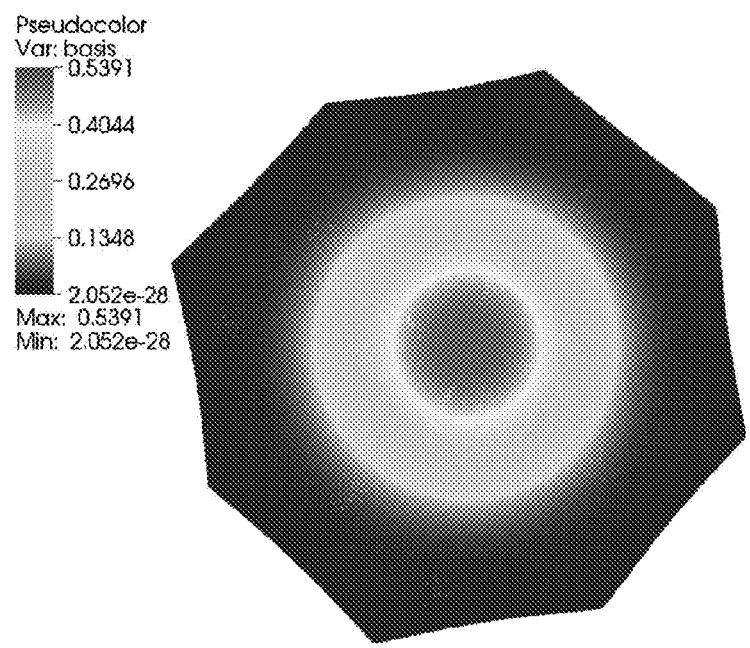
FIG. 7(a) illustrates a basis function associated with a vertex with a valence of 8.
Figure 7B:
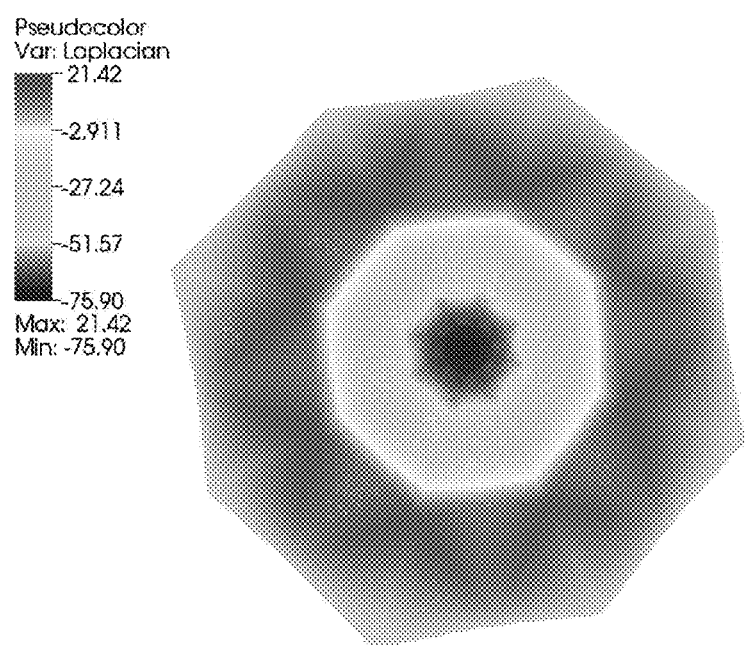
FIG. 7(b) illustrates a surface Laplacian of the basis function associated with a vertex with valence of 8.

FIG. 7(a) gives an example of the scalar basis function used for formulating isogeometric analysis on top of subdivision-described surface, and the basis function is associated with an irregular vertex of valence 8. To show $2^{nd}$ order continuity, the surface Laplacian of the scalar function is plotted in FIG. 7(b). The behavior of the subdivision basis and its derivatives follow:

$$\xi_n(r) \approx O(1), \nabla_s \xi_n(r) \approx O\left(\frac{1}{h}\right) \text{ and } \nabla_s^2 \xi_n(r) \approx O(1/h^2)$$

where h is an approximate dimension of the patch.

Two salient properties of the scalar basis used for this definition are: (i) as they rely on approximating subdivision, they are $C^2$ almost everywhere, and (ii) if $\Omega = \cup_n \Omega_n$, where $\Omega_n$ is the domain associated with $\xi_n(r)$, the function $\xi_n(r)$ vanishes on $\partial \Omega_n$. In other words, the basis functions $\xi_n(r) \in C_0^2$ is almost everywhere.

Next, to use these basis functions to represent the current, note that current on any surface can be represented using a Helmholtz decomposition as represented in equation (5), where $\overline{\omega}(r)$ is the harmonic field and has a trivial solution $(\overline{\omega}(r)=0)$ for simply-connected structures:

$$J(r)=\nabla_s\phi(r)+\nabla\times(\hat{n}\psi(r))+\overline{\omega}(r) \quad (5)$$

Following the subdivision representation in equation (4), it is assumed that $\tilde{\phi}(r)$ and $\tilde{\psi}(r)$ represent approximations to $\phi(r)$ and $\psi(r)$, respectively, and that they can be represented in a manner similar to equation (4), as presented in equation (6):

$$\phi(r)\approx\tilde{\phi}(r)=\Sigma_n\alpha_{1,n}\xi_n(r)$$

$$\psi(r)\approx\tilde{\psi}(r)=\Sigma_n\alpha_{2,n}\xi_n(r) \quad (6)$$

Using equation (6), it is now possible to define the approximations to the current as:

$$J(r) \approx \tilde{J}(r) = \sum_n [\alpha_{1,n}J_n^1(r) + a_{2,n}J_n^2(r)] \quad (7)$$

$$J_n^1 = \nabla_s \xi_n(r)$$

$$J_n^2 = \hat{n} \times \nabla_s \xi_n(r)$$

The physical interpretation of this representation is akin to a standard subdivision representation of a limit surface; the "limit" current is represented via the "limit" scalar functions. The basis for the currents and the auxiliary potentials are represented via operations on the subdivision basis which can be effected numerically rather trivially. The standard definition of the inner product $\langle X,Y\rangle=\int_{\Omega_j}dr X\cdot Y$ is used.

Several properties of the basis functions make this definition appealing. Specifically, due to the reliance on functions $\xi_n(r)$ that are $C_0^2$ almost everywhere, the resulting basis functions have $C^1$ continuity almost everywhere and $C^0$ continuity at isolated points. This stands in stark contrast with classical Rao-Wilton-Glisson (RWG) or their higher order counterparts that are div-conforming but not $C^0$ at the boundary.

Furthermore, the inner product of $\langle J_n^1, J_n^2 \rangle = 0$. The proof for this assertion can be trivially obtained using Green's theorems together with properties of the surface curl and the fact that $\xi_n(r)=0$ for $(r) \in \partial\Omega_i$. Specifically, $$\int_{\Omega_n} dr J_n^1(r) \cdot J_n^2(r) = \oint_{\partial\Omega_n} dr \xi_n(r) \hat{u} \cdot J_n^2(r) - \int_{\Omega_n} dr \xi_n(r) \nabla_s \cdot J_n^2(r) = 0 \quad (8)$$

The function $J_n^1(r)$ maps only to $\nabla_s \phi(r)$, and $J_n^2(r)$ maps only to $\hat{n} \times \nabla_s \psi(r)$. The proof can be obtained using Green's theorems, properties of the surface curl/divergence, and the fact that $\xi(u,v)$ is a partition of unity. Specifically, as shown in equation (9) below, $J_n^1(r)$ completely represents the charge, and the rest of the current is represented by $J_n^2(r)$.

$$\int_{\Omega_n} dr J_n^1(r) \cdot J(r) = \oint_{\partial\Omega_n} dr \xi_n(r) \hat{u} \cdot J(r) - \int_{\Omega_n} dr \xi_n(r) \nabla_s \cdot J(r) = -\int_{\Omega_n} dr \xi_n(r) \nabla_s^2 \phi(r) \quad (9)$$

Another feature of the basis functions is that the basis functions maintain charge neutrality. This is proved as:

$$\int_{\Omega} dr \nabla_s \cdot \tilde{J}(r) = \sum_n \alpha_{1,n} \int_{\Omega_n} dr \nabla_s \cdot \nabla_s \xi_n(r) \quad (10)$$

$$= \Sigma_n a_{1,n} \oint_{\partial\Omega_n} dr \hat{u} \cdot \nabla_s \xi_n(r)$$

$$= 0 \text{ as } \nabla_s \xi_n(r) = 0 \, \forall \in \partial\Omega_n$$

The definition of basis function is compact. The basis functions are subdivision based. As a result, they inherit properties of subdivision representation including adaptivity.

These properties ensure a compete representation of the currents on the surface of a simply connected object, and form a rigorous Helmholtz decomposition of currents on the surface. Again, as opposed to classical basis functions defined on tessellation, Helmholtz decomposition is inherent in the definition of basis functions, whereas the common approach is to design "quasi"-Helmholtz decomposition using weighted sum of basis functions. It should be noted that, in the above representation, the potential functions are the actual unknown functions and not the currents. As a result, extra steps have to be taken to ensure their uniqueness. These are elucidated when using these basis functions within a Galerkin framework.

Figure 8A:
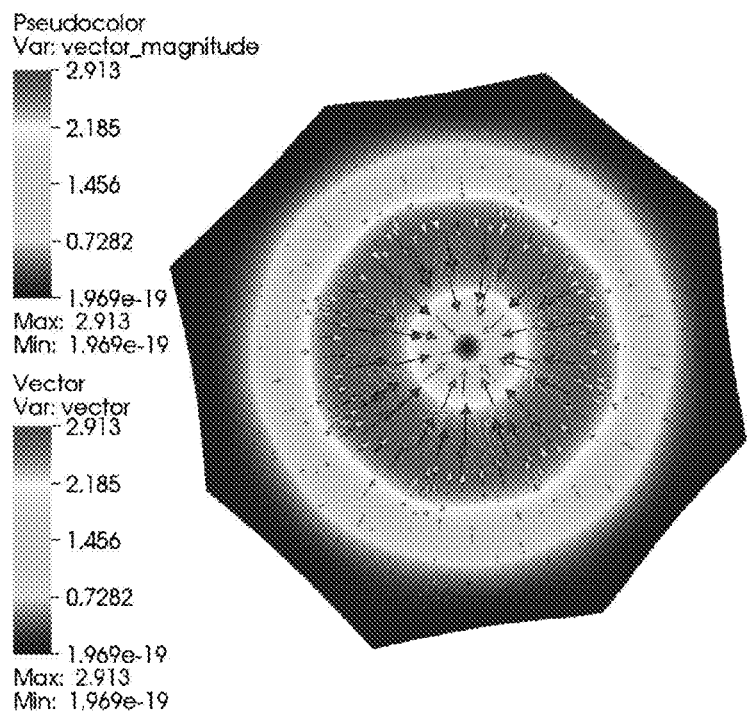
FIG. 8(a) illustrates a nonsolenoidal type basis function associated with a vertex with valence of 8.
Figure 8B:
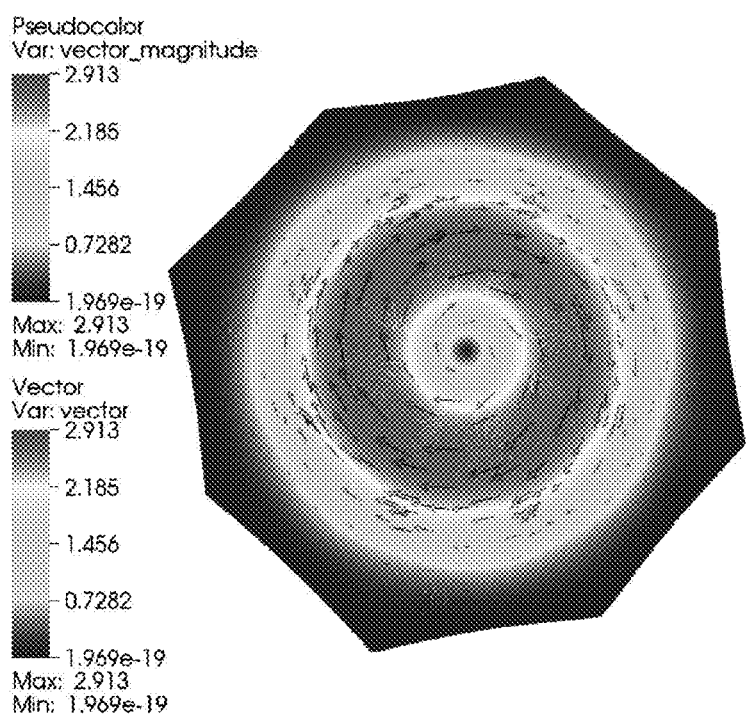
FIG. 8(b) illustrates solenoidal type basis function associated with a vertex with valence of 8.

Using these definitions of basis functions, each vertex is associated with two degrees of freedom. FIGS. 8(a) and 8(b) show the behavior of the two basis functions associated with a node of valence 8. A point to note is that the numbers of solenoidal and non-solenoidal basis functions are equal to each other. As will be seen, this helps create Calderón preconditioners.

3.2. Field Solvers

Given the prescription of basis functions, the discretized version of equation (2a) can be obtained using Galerkin testing. The resulting matrix equation can be written as $$\begin{bmatrix} Z^{11} & Z^{12} \\ Z^{21} & Z^{22} \end{bmatrix} \begin{Bmatrix} I^1 \\ I^2 \end{Bmatrix} = \begin{Bmatrix} V^1 \\ V^2 \end{Bmatrix} \quad (11a)$$

-continued where $$Z_{nm}^{lk} = j\omega\mu_0 \int_{\Omega_n} dr J_n^l(r) \cdot \int_{\Omega_m} dr' g(r,r') J_m^k(r') - \frac{j\delta_{l1}\delta_{k1}}{\omega\varepsilon_0} \int_{\Omega_n} dr \nabla_s \cdot J_n^1(r) \int_{\Omega_m} dr' g(r,r') \nabla_s \cdot J_m^1(r') \quad (11b)$$

$$I_n^k = \alpha_{k,n}; \quad V_n^k = \int_{\Omega_n} dr J_n^k(r) \cdot E^i(r) \quad (11c)$$

In the above equations, $\delta_{ij}$ denotes a Kronecker's delta. Interesting features of the above expression are apparent; (i) $Z_{nm}^{11}$ is the only term that has the charge contribution. As will be shown later, this "decoupling" is an essential component for the construction of low frequency stable solvers, and (ii) since the system of equations is constructed using conditions on currents that rely on derivatives of the potentials $\phi(r)$ and $\psi(r)$ it follows that the potentials are determined up to a constant, and the number of degrees of freedom is less by one for each potential. While one can impose this via different means, the system has been constrained by choosing $\alpha_{1,\mathcal{N}}$ and $\alpha_{2,\mathcal{N}}$ to be zero. This implies a trivial change to the system of equations (11). The evaluation of the inner products in the above equations is effected via higher order quadrature and Duffy integration rules. While the approach presented thus far is valid for all frequencies, it suffers from low-frequency breakdown. To alleviate low-frequency breakdown, equation (11) can be modified. Likewise, Calderón preconditioners can be easily implemented using this space of basis functions.

But before proceeding, interesting insight may be gained by examining the inner products that arise using the Galerkin procedure. Matrices arise from testing the electric field, i.e., $Z_{nm}^{lk}$ corresponds to measuring the radiated electric field due to $E_m(r) \doteq E\{J_m^k\}$ by $J_n^l$. It follows that:

$$\int_{\Omega_n} dr J_n^1(r) \cdot E_m(r) = \int_{\Omega_n} dr J_n^k(r) \cdot E^i(r) \quad (12a)$$

$$= \oint_{\partial\Omega_n} dr \xi_n(r) \hat{u} \cdot E_m(r) - \int_{\Omega_n} dr \xi_n(r) \nabla_s \cdot E_m(r)$$

$$= -\int_{\Omega_n} dr \xi_n(r) \nabla_s \cdot E_m(r)$$

$$\int_{\Omega_n} dr J_n^2(r) \cdot E_m(r) = \int_{\Omega_n} dr \hat{n} \times \nabla_s \xi_n(r) \cdot E_m(r) \quad (12b)$$

$$= \int_{\Omega_n} dr \hat{n} \cdot \nabla \xi_n(r) \cdot E_m(r)$$

$$= \int_{\Omega} dr \hat{n} \cdot (\nabla \xi_n(r) \times E_m(r))$$

$$= \int_{\Omega_n} dr \hat{n} \cdot \nabla \times (\xi_n(r) E_m(r)) - \int_{\Omega_n} dr \xi_n(r) \hat{n} \cdot \nabla \times E_m(r)$$

$$= \oint_{\partial\Omega_n} dr \xi_n(r) E_m(r) \cdot \hat{t} + j\omega\mu_0 \int_{\Omega_n} dr \xi_n(r) \hat{n} \cdot H_m(r)$$

$$= j\omega\mu_0 \int_{\Omega_n} dr \xi_n(r) \hat{n} \cdot (r)$$

In equations (12a) and (12b), $\hat{t}$ is a unit vector tangential to the boundary $\partial\Omega_n$ and $H_n(r)$ is the magnetic field due to $J_m^k$. From the above equations, it is apparent that equation (12a) tests the tangential component of the electric field. However, equation (12b) yields equations that test in normal component of the magnetic field. So the two basis functions used in the analysis impose tangential continuity of the electric field, as well as the normal component of the magnetic field. As a result, using a basis that satisfies the Helmholtz decomposition and relies on scalar function that is $C_0^2$, results in equations that naturally fit into the framework of the Current-Charge Integral Equations (CCIE). It should also be noted that while equations (12a) and (12b) are specified for the scattered field, they are equally valid for the incident field. Indeed, using equation (12b) to evaluate the integrals is more accurate and requires less quadrature points.

3.3. Low-Frequency Stable EFIE

It is well known that EFIE suffers from low-frequency breakdown. The rationale for this breakdown is readily apparent by examining the components of the impedance matrix in equation (11a). Assuming that the average largest linear dimension of the support of the patch is h, it follows that the entries correspond to equation (13):

$$Z_{nm}^{lk} = \mathcal{O}(kh^2) + \delta_{l1}\delta_{k1}\mathcal{O}(1/k) \tag{13}$$

These results follow from the fact that the functions $\xi(r) = \mathcal{O}(1)$. The above scaling indicates that a portion of the elements associated with source and test basis functions that are associated with irrotational functions $J_n^1(r)$ scale as $\mathcal{O}(1/k)$, whereas all others scale as $\mathcal{O}(kh^2)$. This implies that as $k \to \mathcal{O}$, the portion of $Z_{nm}^{11}$ that corresponds to the charge contribution dwarfs the rest. This situation is similar to those encountered by classical Nedelec elements. Here, one takes recourse to loop-star/loop-tree decompositions that effect an approximate Helmholtz decomposition of the currents. As has been shown, the resulting decompositions contain a portion that is exactly divergence free and one that is approximately curl free. Whereas the support of the divergence-free portion is local, the same is not true of the curl-free portion. This is in contrast to the method presented here wherein both components have local support. Using these basis functions results in the charge being modeled correctly, and a matrix whose scaling looks like equation (13). Rescaling these equations has been shown to render the solution stable. Following a similar procedure, it can be shown that rescaling both of the matrix elements, the coefficients, and the right hand side of equation (13) results in the following:

$$Z_{nm}^{lk} = j\omega\beta_{lk}\mu_0 \int_{\Omega_n} dr J_n^l(r) \cdot \int_{\Omega_m} dr' g(r, r') J_m^k(r') - \tag{14}$$
$$\frac{j\delta_{l1}\delta_{k1}}{\varepsilon_0} \int_{\Omega_n} dr \nabla_s \cdot J_n^l(r) \int_{\Omega_m} dr' g(r, r') \nabla_s \cdot J_m^l(r')$$

where $$\beta_{lk} = \begin{cases} \omega & \text{if } l=1, k=1 \\ \omega^{-1} & \text{if } l=2, k=2 \\ 1 & \text{otherwise} \end{cases} \tag{15}$$

$$I_n^k = \alpha_{k,n}\omega^{-\delta k1}; V_n^k = \omega^{-\delta k2} \int_{\Omega_n} dr J_n^k(r) \cdot E^i(r) \tag{16}$$

As prescribed, these equations achieve the desired stability. As can be trivially shown, these equations decouple as $\omega \to 0$. This is akin to similar prescriptions for classical loop-star/tree algorithms. However, a salient feature of the IGA-basis is that constructing a well-behaved system is tantamount to using a diagonal scaling sans constructing the complementary system that is required for a loop-tree/star (Hodge) decomposition.

It should be noted that Helmholtz decomposition is not the only way to solve low-frequency breakdown, and other techniques can be applied. The isogeometric basis functions presented herein could help construct those methods.

3.4. Calderón Preconditioner

It is well known that the standard EFIE presented in the earlier sections is a first kind equation and, as with all first kind equations, can be ill-conditioned especially when the spatial scales in the problem are widely separated. The rationale for the ill-conditioning is the spectral separation of the eigenvalues of the operator with increase in discretization density, with a set that clusters around zero and others that cluster around infinity. Given this separation, the resulting matrix systems become rapidly ill-conditioned. The remedy to this problem exploits the Calderón identities wherein the EFIE operator ($T\{\cdot\}$) preconditions itself resulting in a second kind integral operator whose eigenvalues accumulate around $-\frac{1}{4}$. The challenge in using these identities was the lack of well-behaved Gram matrices that link the domain and range of the T operator. The basis function defined herein result in a well-conditioned Gram matrix, thereby permitting a natural discretization of the Calderón operator. To begin, the following operators are defined:

$$T \circ J(r) = T_a \circ J(r) + T_\phi \circ J(r) \tag{17a}$$

where $$T_a \circ J(r) \doteq -j\omega\mu_0 \hat{n}(r) \times \int_{\partial\Omega} dr' g(r, r') \cdot J(r') \tag{17b}$$

$$T_\phi \circ J(r) \doteq -j\frac{1}{\omega\varepsilon_0} \hat{n}(r) \times \int_{\partial\Omega} dr' \nabla\nabla g(r, r') \cdot J(r')$$

The Calderón projector is defined as $T^2 \circ J(r) \doteq T \circ T \circ J(r)$. It has been shown that $$T^2 \circ J(r) = \left(-\frac{1}{4} + K^2\right) \circ J(r)$$

where $K^2 \circ J(r) \doteq K \circ K \circ J(r)$. Alternatively, this operator can be written as $T^2 \circ J = (T_a \circ T_a + T_a \circ T_\phi + T_\phi \circ T_a + T_\phi \circ T_\phi) \circ J$. It follows that the well conditioning of this operator is due to clustering of eigenvalues around $-\frac{1}{4}$. Since direct discretization of $T^2$ is impossible, typical implementation follows the multiplier approach; i.e., define intermediate mapping from the range space of the T operator to the domain of the T. This is typically affected via a Gram matrix and has been extensively explored. Given the usage of Helmholtz decomposition in equation (7) and the orthogonality in equation (8) between the two components, it can be shown that $T_\phi \circ T_\phi \circ J = 0$. Enforcing the latter condition has been difficult to accomplish in traditional discretization and representation schemes.

The principal advantage of using equation (7) is that it enforces an exact global Helmholtz decomposition in terms of a set of local scalar functions that are $C_0^2$ almost everywhere. Recall the following: $\langle J_n^l, J_m^k \rangle = \lambda_{nm} \Theta^{lk}$, where $\lambda_{nm}$ is the result of evaluating the inner product over the support of basis functions $\Omega_n \cap \Omega_m$ and is defined in equation (19). As a result, the Gram matrix G is block diagonal with entries $G_{nm}^{lk} = \lambda_{nm} \partial^{lk}$. Given a pair of spaces, $(J^1, J^2)$, it can be shown that the following sequence is satisfied: $(J^1, J^2) \xrightarrow{T} (J^2, J^1) \xrightarrow{T} (J^1, J^2)$. Specifically, $(J^1, J^2) \xrightarrow{T\phi} (J^2, 0)$ and $(J^1, J^2) \xrightarrow{Ta} (J^2, J^1)$. It follows from the above that $(J^1, J^2) \xrightarrow{T\phi} (J^2, 0) \xrightarrow{T\phi} (0, 0)$. In matrix form, the above sequence can be rewritten as $$TG^{-1}T = \begin{bmatrix} T_a^{11} & T_a^{21} \\ T_a^{21} + T_\phi^{21} & T_a^{22} \end{bmatrix} \begin{bmatrix} G^{11} & 0 \\ 0 & G^{22} \end{bmatrix}^{-1} \begin{bmatrix} T_a^{11} & T_a^{21} \\ T_a^{21} + T_\phi^{21} & T_a^{22} \end{bmatrix} \quad (18)$$

Finally, a critical component in discretizing the $T^2$ operator is the Gram matrix. The benefits of using local Helmholtz decomposition becomes apparent in its construction with the off-diagonal blocks being zero and the element of the diagonal blocks being $$\gamma_{nm} = \int_{\Omega_n \cap \Omega_m} dr \nabla_s \xi_n(r) \cdot \nabla_s \xi_m(r) \quad (19)$$

that are a variational form of the Laplace-Beltrami operator on a scalar function. The resulting system is positive definite leading to well behaved inverse of the Gram system.

4. Numerical Examples

This section presents several numerical examples to demonstrate the efficacy of the proposed approach to electromagnetic analysis. In order to do so, data will be presented that demonstrates the following; (i) accuracy of the approach when compared against analytical data; (ii) examples illustrating low frequency stability, (iii) analysis of multiscale structures to illustrate the efficiency of the Calderón preconditioner, and (iv) application to complex targets. Unless stated otherwise, the data presented compares in radar scattering cross-section computed using the IGA-MoM solver and those computed using either analytical methods (if available) or a validated method of moments code that is based on RWG basis functions.

4.1. Accuracy of IGA-MoM

To validate and demonstrate the accuracy of the proposed approach, an example of scattering from a sphere discretized at multiple resolutions is presented. In the example, consider a sphere $1\lambda$, that is modeled using an initial control mesh comprising 642 vertices. Starting from this control mesh and performing one and two Loop subdivision results in two other meshes with 2562 and 10242 vertices, respectively. This results in three meshes with 1280, 5120, and 20480 faces. Note that the limit surface for all three mesh densities is identical. As a result, what changes is the support of the basis functions and, therefore, approximations to the discrete operators. In all of the data presented below, a field propagating in $\hat{k} = -\hat{z}$ and polarized along $\hat{x}$ axis is incident on the sphere. The number of degrees of freedom (DoF) for IGA-MoM is twice the number of vertices; consequently, the three tests have 1284, 5124, and 20484 DoFs, respectively. Table 1 presents errors in currents on the surface of the sphere (between those obtained using IGA-MoM and Mie series) for these three different discretizations. Likewise, FIGS. 7(a) to 9(a) present point wise errors in absolute values of the real and imaginary parts of the current for the case of two subdivisions. As is evident, the errors in the current both in the $L_2$ and $L_1$ norms are excellent.

TABLE 1

| | Rel. $L_2$ error in the currents density | | |
|---|---|---|---|
| subdivision times | 0 | 1 | 2 |
| average element size | 0.1511 | 0.0755 | 0.0377 |
| Rel. $L_2$ error | 0.0257 | 0.0067 | 0.0030 |

4.2. Scattering from Structures at Regular Frequency

In what follows, the performance of the proposed approach described herein is compared with a conventional MoM EFIE solution technique that relies on RWG basis functions. Unless specified otherwise, the metric for comparison is RCS data in the $\phi=0$ plane. Furthermore, the geometry of all scatterers that are analyzed in this paper is smooth; extension to non-smooth structures is non-trivial but realizable from a subdivision perspective. IGA solvers that include open and sharp surfaces will form the basis of future work.

The first example is a truncated cone, with the height $3.0\lambda$ and the radii of the top and bottom circular cross-sections being $0.2\lambda$ and $1\lambda$, respectively. A plane wave that is polarized along $\hat{x}$ and propagating in the $-\hat{z}$ direction is incident on the object. The object is represented using 12378 nodes; this number is increased at the top and bottom surfaces so as to maintain a sufficient degree of sharpness. The number of DoFs for IGA-MoM and conventional MoM are 24756 and 37128, respectively. The surface current density obtained using IGA-MoM is depicted in FIGS. 12(a) and 12(b). It is evident from these plots that the currents are smooth (without unphysical aberrations anywhere, especially near the crease). FIG. 13 compares the radar cross section between the proposed method and the conventional method of moments, and it is apparent that the agreement between the two is excellent.

The second example is a structure composed of block ($3.33\lambda \times 10.0\lambda \times 1.33\lambda$) and five cylinders (radius is $0.5\lambda$ and the height is $0.67\lambda$) uniformly distributed on the top surface of the block. An electromagnetic field that is propagating along $-\hat{y}$ and polarized along the $\hat{z}$ is incident on this object. The number of DoF for the IGA-MoM and conventional MoM are 29028 and 43536, respectively. FIGS. 14(a) and 14(b) present the real and imaginary parts of the current distribution on the surface of the object, and again, it is evident that the results are smooth with artifacts. Further, excellent agreement can be seen between IGA-MoM and conventional MoM in the RCS data in FIG. 15.

As a final example in this set, scattering from a model airplane whose dimensions are $5.49\lambda \times 5.48\lambda \times 1.52\lambda$ is presented. The plane wave incident on the object is propagating along $-\hat{y}$ and polarized along $\hat{z}$. As before, data is obtained using both IGA-MoM and conventional MoM using 23988 and 35976 DoFs, respectively. The current distribution using IGA-MoM is depicted in FIGS. 16(a) and 16(b). Again, it is evident that the current is well captured as is the scattering cross-section (see FIG. 17).

4.3. Conditioning of Isogeometric System at Low-Frequency

Next, the stability of the resulting system and its preconditioned form at low frequency using IGA basis and the aforementioned wavenumber scaling are discussed. The metrics used for the discussion are both the condition number of the resulting system, and the number of iterations necessary to achieve a desired error tolerance when solving this system using an iterative solver. In all of the examples presented, a generalized minimal residual iterative solver (GMRES) is used, and the object being analyzed is a sphere with radius 1 m that is discretized such that the average distance between vertices is around 0.15 m.

FIG. 18 depicts the condition number of IGA-MoM systems as a function of frequency from 1 Hz to 100 MHz. The three curves are, respectively, for the original IGA system, the diagonal scaled system, and the Calderón preconditioned system. From the plots, it is evident that the condition number is almost constant over the whole band for all of the systems. Both diagonal scaling and application of the Calderón precondition offer significant improvements over the original IGA-MoM. Note, the behavior of the original IGA-MoM is very much unlike convention MoM, and it is thanks to the properties of the basis function used.

Next, the number of GMRES iterations required to converge to an error tolerance of $1.0 \times 10^{-6}$ and $1.0 \times 10^{-10}$ at various frequencies is examined. These results are depicted in FIGS. 19 and 20, respectively. Since the iterative numbers for the original IGA system are much higher than that of the diagonal scaled and Calderón preconditioned system, only the iterations numbers for the latter two systems are given. As seen in the two plots, the number of iterations required for both systems are relatively constant across a range of frequencies (from 1 Hz to 100 MHz).

These two tests serve to illustrate some of the salient features of the proposed approach. First, low frequency stability is achieved simply by diagonal scaling. This is in contrast with conventional approaches where it is explicitly necessary to define auxiliary unknowns at linear cost. Secondly, imposition of the Calderón precondition involves an inversion of the Gramm matrix as an addition operation. The original matrix system is retained which makes integration with fast methods trivial. This is different from existing methods that require Buffa-Christiansen basis functions to be defined on barycentric meshes. Finally, as is evident from FIG. 21, the results obtained from the Calderón preconditioned solver at 1 Hz agree very well with the analytical data obtained.

4.4. Examples with Multi-Scale Mesh

In all of the examples analyzed thus far, the initial control mesh is such that the resulting tessellation is almost uniform in that the ratio of the maximum edge length to the minimum edge length is O(1). However, a more intellectually interesting and practically applicable problem is when this ratio is significantly higher. It is challenging to design stable methods for these problems due to two effects that act in concert with each other; wavenumber and element size scaling. In this example, scattering from a sphere with locally refined meshes is simulated and verified by comparing with the one with almost uniform initial control mesh. FIGS. 22(a) and 22(b) demonstrate the multiscale control mesh for the unit sphere. The radius of the sphere is $1\lambda$, and the incident plane wave is polarized along the $\hat{x}$ direction and propagating in the $-\hat{z}$ direction. The resulting system of equations is solved using GMRES. FIG. 23 compares the convergence history for both the Calderón preconditioned system as well as a diagonal preconditioned system. The efficacy of the Calderón preconditioned system is evident by the rapid convergence.

Besides the electric field integral equation that we have used to illustrate the application of isogeomtric analysis, the vector basis function defined utilizing equivalent scalar basis function and Helmholtz decomposition can be used for other surface integral equations that are commonly used in electromagnetic field analysis. In magnetic field integral equations for perfectly electrically conductors, where the unknown is also the electric current, very similar procedures can be followed to solve for the unknown current coefficients associated with each vertex. In more general piecewise homogeneous dielectric problem, where both electric currents (or tangential magnetic fields) and magnetic currents (or tangential electric fields) are unknown, the basis function defined here can be used. In this case, coefficients of either current would be associated with each vertex. In general, different types of surface integral equations arising to describe electromagnetic scattering or radiation can be solved based on the vector basis functions proposed above. Examples include but are not limited to a magnetic field integral equation, a combined field integral equation, a Poggio-Miller-Chu-Harrington-Wu-Tsai integral equation, a Müller integral equation or a combination thereof.

Based on the foregoing principles, the EMSA module 100 performs one or more operations to determine the isogeometric basis functions (i.e., effective basis function), and use these to construct the geometry and current representations, discretize the requisite integral equations and solve the resulting linear system. Specifically, in order to determine geometric and electromagnetic basis functions, the geometry module 204 and the electromagnetic basis module 206 determine the scalar bases associated with each vertex function using Loop subdivision. More particularly, FIG. 24 illustrates a basis function routine 300 for determining a geometric basis function and the electromagnetic basis function. At 302, the routine determines whether information regarding the geometry of the object has been received. Specifically, the routine 300 determines whether the basic structure of the object has been received from the input interface 202. The routine 300 remains at 302, until such information is available.

If the geometry information is available, the routine 300 analyzes each of the vertices to determine whether a given vertex is a regular vertex or an irregular vertex. For example, a vertex having a valence of 6 is provided as a regular vertex and a vertex having any other valence is an irregular vertex. Specifically, at 304 the routine 300 determines the number of vertices in the object and sets the number as "V". At 306, the routine sets "v" to 1, where "v" represents the $v^{th}$ number vertex of the object. At 308, the routine 300 determines whether the $v^{th}$ vertex is a regular or an irregular vertex. If the $v^{th}$ vertex is regular, the routine determines if all of the vertices have been evaluated at 310. If there is a vertex that still needs to be analyzed, the routine 300, increments the value of "v" and analyzes the $v^{th}$ vertex at 308. If a vertex is an irregular vertex, the routine 300, at 314, refines the triangles around the vertex using a subdivision scheme.

If all of the vertices have been evaluated, the routine determines an effective scalar basis function using Loop subdivision at 316. The effective scalar basis function is used to generate the geometric basis function and $C^2$ smooth geometric representation of the object at 318. In addition to the geometric basis function, the scalar basis function is used to construct the electromagnetic basis function at 320. Specifically, the electromagnetic basis function is approximated using Helmholtz decomposition equation that in turn relies on operations upon the scalar basis functions.

The routine 300 is performed by the geometry module 204 and the electromagnetic basis module 206. Specifically, the geometry module 204 performs steps 302 to 318 to determine the geometric basis function and the $C^2$ smooth geometric representation of the object. The geometry module 204 outputs this information to the isogeometric analysis module 208. The electromagnetic basis module 206 performs steps 302 to 316 and 320 to determine the electromagnetic basis function and outputs the electromagnetic basis function to the isogeometric analysis module 208.

Using the geometric basis function and the electromagnetic basis function, the isogeometric analysis module 208 constructs a discretized electromagnetic system and solves the linear system. More particularly, FIG. 25 illustrates a linear system solver routine 400 for solving the linear system of an electrically conducting object.

At 402 and 404, the routine 400 determines whether the geometry representation of the object from the geometry module 204 and the electromagnetic basis function constructed by the electromagnetic basis module 206 are received, respectively. If the information from the geometry module 204 and the electromagnetic basis module 206 are received, the routine 400 determines whether input information regarding the electromagnetic field has been received from the input interface 202 at 406.

From 406 the routine 400 constructs a discretized electromagnetic system based on the geometric and electromagnetic basis functions for the linear integral equation at 408. Based on the electromagnetic field information, the routine 400 determines if the frequency of the electromagnetic field is a low frequency (e.g., the frequency is below a certain threshold) at 414. If the frequency is low, the routine 400 uses Calderón preconditioner to stabilize the system at 410. After applying the Calderón preconditioner or determining that the frequency is not low, the routine 400 solves the linear system at 416. At 420, the routine 400 performs a post processing procedure in which solution to the linear system is outputted. The post processing procedure may include displaying a model, a chart, and/or graph that indicates the solution of the linear system. As an example, the routine 400 may display on a monitor a model that illustrates the magnitude of surface current density on the object analyzed. In another example, the magnitude of the surface current density on the object may be used to change the geometry of the object, for example the design of an antenna.

The present disclosure describes an isogeometric analysis technique for solving the electric field integral equation that is encountered in electromagnetic field analysis. The fundamental thesis of isogeometric methods is that: (i) it avoids the awkward transition between CAD and analysis tessellation, and (ii) it inherits the rather significant advantages of modern CAD tools-smoothness of geometry representation, morphing, and dynamic meshes by using the same basis sets for both geometry representation as well as representation of physics on this geometry. The approach presented here leverages existing geometric construction techniques that use subdivision to define basis functions that result in well-behaved integral operators. Due to these operators, it is possible to impose Calderón preconditioners and construct systems that are low-frequency stable and can handle multiscale geometric features. A number of results demonstrate the convergence and accuracy of the technique, applicability to computation of scattering at both regular as well as low frequencies, and to structures with multiscale features.

The foregoing description of the embodiments has been provided for purposes of illustration and description. It is not intended to be exhaustive or to limit the disclosure. As an example, FIG. 1 illustrates the EMAS module as being part of a laptop device. The EMAS module may be a stand-alone single chip system and is not required to be part of a laptop. Another variation may include the configuration of the EMAS module. For example, the present disclosure describes the geometry module and the electromagnetic basis module as determining an effective basis function around each vertex of an object. Alternatively, EMAS module may be configured such that the geometry module may output the equivalent basis function to the electromagnetic basis module, which then calculates the electromagnetic basis function. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

What is claimed is:

1. A method for simulating fields on a surface of a physical object, comprising:
    imaging the surface of the physical object using a sensor to create imaging data;
    based on the imaging data captured by the sensor, generating a polygon control mesh that represents the surface of the physical object, wherein the polygon control mesh defines a collection of points on the surface of the physical object and connectivity between the points;
    determining a geometric basis function that represents the surface of the physical object using the polygon control mesh, wherein the geometric basis function is continuous, and wherein a first derivative of the geometric basis function is continuous;
    using a Helmholtz decomposition together with the geometric basis function to produce a vector basis function that has a rotational component and a diverging component, wherein the rotational component is orthogonal to the diverging component;
    specific to the surface of the physical object, constructing a discrete linear system describing a physical external field impinging on the physical object, wherein the discrete linear system is based on a representation of equivalent currents defined on the surface of the physical object in terms of the rotational component and the diverging component;
    generating a solution to the discrete linear system; and
    determining a physical field at a physical location with respect to the physical object in space using the solution to the discrete linear system.

2. The method of claim 1 wherein determining the geometric basis function further comprises (a) parsing all vertices in the polygon control mesh, (b) determining whether a given vertex in the polygonal control mesh is regular or irregular, and (c) refining polygons of the polygon control mesh adjacent to the given vertex using subdivision in response to a determination that the given vertex is irregular.

3. The method of claim 1 further comprising determining the geometric basis function using subdivision.

4. The method of claim 1 further comprising constructing the discrete linear system for the physical object by combining the vector basis function with a surface integral equation and creating a matrix equation using Galerkin approach.

5. The method of claim 1 wherein the discrete linear system is derived using a surface integral equation comprising an electric field integral equation, a magnetic field integral equation, a combined field integral equation, a Poggio-Miller-Chu-Harrington-Wu-Tsai integral equation, a Müller integral equation, or a combination thereof.

6. The method of claim 1 further comprising solving the discrete linear system for the physical object using a Krylov subspace solver.

7. The method of claim 6 further comprising developing a Calderon preconditioner to accelerate convergence of the Krylov subspace solver so as to avoid low-frequency breakdown.

8. The method of claim 1 wherein a second derivative of the geometric basis function is continuous.

9. A method for simulating electromagnetic fields on a surface of an electrically conducting physical object, comprising:
    imaging the surface of the physical object using a sensor;
    generating a polygon control mesh from imaging data captured by the sensor, where the polygon control mesh represents the surface of the physical object using either triangles or quadrilaterals and the polygon control mesh defines a collection of points on the surface of the physical object and connectivity between the points;
    determining a geometric basis function that represents the surface of the physical object, wherein the geometric basis function is determined from the polygon control mesh using subdivision, wherein the geometric basis function is continuous, and wherein a first derivative of the geometric basis function is continuous;
    determining a vector basis function that represents current on the surface of the physical object using a Helmholtz decomposition, wherein the vector basis function has a first component and a second component that is orthogonal to the first component;
    constructing a discrete electromagnetic system for the physical object that is representative of tangential magnetic fields on the surface of the physical object due to an interrogating electromagnetic field, wherein the discrete electromagnetic system is derived from an electric field integral equation and using the geometric basis function and the first and second components of the vector basis function;
    solving the discrete electromagnetic system for the tangential magnetic fields on the physical object; and
    determining a physical field quantity a physical point relative to the physical object using the tangential magnetic fields from the solved electromagnetic system.

10. The method of claim 9 wherein determining the geometric basis function further comprises (a) parsing all vertices in the polygon control mesh, (b) determining whether a given vertex in the polygonal control mesh is regular or irregular, and (c) refining polygons of the polygon control mesh adjacent to the given vertex using subdivision in response to a determination that the given vertex is irregular.

11. The method of claim 9 further comprising constructing the discrete electromagnetic system by combining the vector basis function with the electric field integral equation and creating a matrix equation using Galerkin approach.

12. The method of claim 11 further comprising solving the discrete electromagnetic system for the physical object using a Krylov subspace solver.

13. The method of claim 12 further comprising developing a Calderon preconditioner to accelerate convergence of the Krylov subspace solver so as to avoid low-frequency breakdown.

14. The method of claim 9 further comprising changing geometry of the physical object based in part on the tangential magnetic fields from the solved electromagnetic system.

15. The method of claim 9 wherein a second derivative of the geometric basis function is continuous.

16. A method for determining a response along a surface of a physical object to external physical stimuli, comprising:
   imaging the surface of the physical object using a sensor;
   generating a polygon control mesh from imaging data captured by the sensor, where the polygon control mesh represents the surface of the physical object, wherein the polygon control mesh defines a collection of points on the surface of the physical object;
   determining a geometric basis function that represents the surface of the physical object, wherein the geometric basis function is determined from the polygon control mesh using subdivision, wherein the geometric basis function is continuous, and wherein a first derivative of the geometric basis function is continuous;
   associating a physical property with each point in the collection of points on the surface of the physical object;
   determining a physical basis function that represents the physical property along the surface of the physical object using a Helmholtz decomposition, wherein the physical basis function has a rotational component and a diverging component, and wherein the rotational component is orthogonal to the diverging component;
   constructing a discrete linear system for the physical object for finding a value of the physical property on the surface of the physical object caused by the external physical stimuli, wherein the discrete linear system is derived from the geometric basis function and the rotational and diverging components of the physical basis function; and
   solving the discrete linear system to determine the values of the physical property on the surface of the physical object.

17. The method of claim 16 wherein the external physical stimuli is an acoustic wave and the physical property is one of velocity potential or normal component of the velocity.

18. The method of claim 16 wherein the external physical stimuli is a voltage and the physical property is electric charge on the surface of the physical object.

19. The method of claim 16 wherein the external physical stimuli is a force applied to the surface and the physical property is displacement of the surface of the physical object.

20. The method of claim 16 wherein the external physical stimuli is an electromagnetic field and the physical property is one of electric current or magnetic current.

21. The method of claim 16 wherein a second derivative of the geometric basis function is continuous.

* * * * *

UNITED STATES PATENT AND TRADEMARK OFFICE
CERTIFICATE OF CORRECTION

PATENT NO. : 10,102,319 B2
APPLICATION NO. : 15/210972
DATED : October 16, 2018
INVENTOR(S) : Jie Li et al.

Page 1 of 1

It is certified that error appears in the above-identified patent and that said Letters Patent is hereby corrected as shown below:

In the Specification

Column 2, Line 8, "positively" should be --positivity--.

Column 2, Line 40, "(lEs)" should be --(IEs)--.

Column 6, Line 20, "C)" should be --$\Omega$--.

Column 6, Line 42, "$\tau$" should be --$\mathcal{J}$--.

Column 6, equation 2(a), Line 48, "EFIE: $\hat{n}(r) \times (E^i(r)+E^s(r))=0 \forall r \in \partial\Omega$" should be
--EFIE: $\hat{n}(r) \times \hat{n}(r) \times (E^i(r) + E^s(r)) = 0 \, \forall r \in \partial\Omega$--.

Column 6, equation 2(b), Line 50, "MFIE: $\hat{n}(r) \times (H^i(r)+H^s(r))=0 \forall r \in \omega\Omega$" should be
--MFIE: $\hat{n}(r) \times (H^i(r) + H^s(r)) = 0 \, \forall r \in \partial\Omega$--.

Column 8, Line 31, "V." should be --$V_i$.--.

Column 9, Line 33, "king" should be --I-ring--.

Colum 12, equation 12(a), Lines 36 – 39, "$\int_{\Omega_n} dr J_n^1(r) \cdot E_m(r) = \int_{\Omega_n} dr J_n^k(r) \cdot E^i(r)$" should be
--$\int_{\Omega_n} dr f_n^1(r) \cdot E_m(r) = \int_{\Omega_n} dr \nabla_s \xi_n(r) \cdot E_m(r)$--.

Column 15, Line 47, "1$\lambda$," should be --1$\lambda$--.

Signed and Sealed this
First Day of October, 2019

Andrei Iancu
*Director of the United States Patent and Trademark Office*